United States Patent
Imaida et al.

(10) Patent No.: US 7,421,504 B2
(45) Date of Patent: Sep. 2, 2008

(54) SERVICE PROVIDING DEVICE AND SERVICE PROVIDING METHOD

(75) Inventors: Kazuto Imaida, Takatsuki (JP); Masayo Takemoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 937 days.

(21) Appl. No.: 10/424,866

(22) Filed: Apr. 29, 2003

(65) Prior Publication Data
US 2004/0010564 A1 Jan. 15, 2004

(30) Foreign Application Priority Data
May 8, 2002 (JP) ............... 2002-133272

(51) Int. Cl.
*G06F 15/16* (2006.01)
*G06F 7/00* (2006.01)
*G06F 17/30* (2006.01)

(52) U.S. Cl. .................. 709/229; 707/3; 707/10
(58) Field of Classification Search ............... None
See application file for complete search history.

(56) References Cited

U.S. PATENT DOCUMENTS

| | | | |
|---|---|---|---|
| 6,317,722 B1 | 11/2001 | Jacobi et al. | |
| 6,327,574 B1* | 12/2001 | Kramer et al. | ............... 705/14 |
| 6,807,574 B1 | 10/2004 | Partovi et al. | |
| 2001/0021914 A1 | 9/2001 | Jacobi et al. | |
| 2001/0051876 A1 | 12/2001 | Seigel et al. | |
| 2001/0054002 A1 | 12/2001 | Suzuki et al. | |
| 2002/0010625 A1 | 1/2002 | Smith et al. | |
| 2002/0019763 A1 | 2/2002 | Linden et al. | |
| 2002/0052925 A1* | 5/2002 | Kim et al. | ............... 709/217 |
| 2002/0147638 A1* | 10/2002 | Banerjee et al. | ............... 705/14 |
| 2002/0178166 A1* | 11/2002 | Hsia | ............... 707/100 |
| 2003/0105682 A1 | 6/2003 | Dicker et al. | |
| 2003/0149623 A1* | 8/2003 | Chen | ............... 705/14 |
| 2003/0154126 A1* | 8/2003 | Gehlot et al. | ............... 705/14 |
| 2004/0068477 A1* | 4/2004 | Gilmour et al. | ............... 707/1 |

FOREIGN PATENT DOCUMENTS

JP 2001-125956 5/2001

* cited by examiner

*Primary Examiner*—John B. Walsh
(74) *Attorney, Agent, or Firm*—Wenderoth, Lind & Ponack, L.L.P.

(57) ABSTRACT

A member information unit, a service history unit and a log information unit for acquiring information from a company's member terminal hold respectively member information including a URL indicating the location of the company's own website, questionnaire information and log information. A predicting unit derives an area of the company's purchase orientation based on the member information, the questionnaire information and the log information. A searching unit accesses the company's own website based on the URL to extract orientation area descriptions belonging to the area of the company's orientation derived by the predicting unit. An analysis instructing terminal displays the extracted orientation area descriptions.

19 Claims, 47 Drawing Sheets

Fig. 4

Member information

| Member ID | Company name | Industry | Person in charge | Company's own HP-URL | Password |
|---|---|---|---|---|---|
| 12345 | XX Electric | Home appliance | A Matsugami | http://www.xx.denki.com/ | a1b2c3 |
| 12346 | YY Camera | Camera | B Takenaka | http://www.yy.co.jp/ | d4e5f6 |
| 12347 | ZZ Company | Transport | C Umeshita | http://www.zz.shoukai.ne.jp/ | g7h8i9 |
| | | | | | |
| | | | | | |

Fig. 5A

Log information (Number of views)

Member ID 12345 — 610a

| Date | Page Type | No. | Number of views |
|---|---|---|---|
| 2002/3/5 | News | 5 | 3 |
| 2002/3/10 | Weather report | 4 | 1 |
| 2002/3/11 | Recipe | 3 | 5 |
| 2002/3/12 | Home electric appliances information | 2 | 4 |

Fig. 5B

Log information (Time duration)

Member ID 12345 — 610a

| Date & Time | Page Type | No. | Time duration of viewing |
|---|---|---|---|
| 2002/3/5 11:15 | News | 5 | 10 |
| 2002/3/10 15:30 | Weather report | 4 | 1 |
| 2002/3/11 15:30 | Recipe | 3 | 20 |
| 2002/3/12 15:30 | Home electric appliances information | 2 | 15 |

Fig. 6A

Service history information (Questionnaire information)

| Member ID 12345 | | | | | | |
| --- | --- | --- | --- | --- | --- | --- |
| Questionnaire ID 123 | | | | | | 608a |
| Question No. | Answer 1 | Answer 2 | Answer 3 | Answer 4 | Answer 5 | Others |
| 1 | ○ | | | | | |
| 2 | | | | ○ | | |
| 3 | | | ○ | | | |
| 4 | | ○ | | | | |
| | | | | | | |
| | | | | | | |

Fig. 6B

Service history information (Purchase information)

| Member ID 12345 | | | | | 608b |
| --- | --- | --- | --- | --- | --- |
| Order date | Product number | Delivery date | Price | Number of ordered products | Amount of payment |
| 2002/2/28 | 1524 | 2002/3/3 | 15,000 | 100 | 1,500,000 |
| 2002/2/28 | 3612 | 2002/3/3 | 35,000 | 50 | 1,750,000 |
| 2002/1/19 | 0101 | 2002/1/22 | 15,000 | 200 | 3,000,000 |
| | | | | | |
| | | | | | |

Fig. 7

Service information

| Keyword | Relevant information | Means | Type | Service |
| --- | --- | --- | --- | --- |
| | | | | Text |
| Microwave oven | Discount | E-mail 1 | Revised price (discount) information | We will revise (discount) wholesale prices of microwave ovens. Product number: a12345, a12346, b00123, b00124 When: For products delivered on and after 1st next month New price: Our staff will inform you at his visit. |
| | | E-mail 2 | Inventory clearance campaign | We will conduct inventory clearance campaign before release of new products next month. Product number: a12344, b00122 When: Until release of new products Details: Our staff will inform you at his visit. |
| | | Partner company's page 1 | New product information | We will hold a briefing of new microwave ovens with single function to be released in 3 months. Please select your convenient date from among the following dates. Product number: c01266(Product number may be changed before release) When: 10th, 12th or 13th of next month Where: Our staff will visit you. |
| | | Partner company's page 2 | Replacement advise | We will offer a service of electric expenses comparison between your microwave oven and a new one. We will calculate the difference for one month based on the product numbers of your microwave oven and a new one you are considering the purchase. How: Please access our home page at www.aa.com/densirenzi/hikaku/ When: On and after 15th next month |
| | | ... | ... | ... |

Service information

| Keyword | Relevant information | Service | | |
|---|---|---|---|---|
| | | Means | Type | Text |
| Microwave oven | Campaign | E-mail 1 | Advance sale of new products | This informs you about advance sale of new products to be released on 20th next month.<br>Product number:a12347, b00125<br>When: 1st next month ~ date of release<br>How: Our staff will inform you at his visit. |
| | | E-mail 2 | Staff dispatch | We will dispatch our staff to explain a new product. Please let us know if you want.<br>Product number:a12347, b00125<br>When: For 1 month from release<br>Staff: 1 staff will visit 1 store as a rule. |
| | | Partner company's page 1 | Color selection campaign | We will offer a new product in your favorite color.<br>Product number:a12347, b00125<br>When: For 3 months from release<br>How: Our staff will inform you at his visit. |
| | | Partner company's page 2 | Frozen food home delivery | We will start a service of delivering frozen food to your house if you apply at the time of purchasing a microwave oven.<br>Product number: Any models you sold<br>When: Start on 1st next next month<br>How: Our staff will inform you at his visit. |
| | | ... | ... | ... |

Service information — 605a

| Keyword | Relevant information | Service | | |
|---|---|---|---|---|
| | | Means | Type | Text |
| Induction heating cooker | EF Company | E-mail 1 | New product briefing | We will hold a briefing of new induction heating cookers to be released next month. Please select your convenient date.<br>Product number: z01214 (Product number may be changed before release)<br>When: 10th, 12th or 13th next month<br>How: Our staff will visit you. |
| | | E-mail 2 | Staff evaluation | Please evaluate work behavior of our staff.<br>When: 18th, 20th or 24th next month<br>How: Our sales manager will visit you. |
| | | Partner company's page 1 | Questionnaire | We will conduct questionnaire on induction heating cookers. Your cooperation will be appreciated. Are you dissatisfied with induction heating cookers? Are low prices attractive? |
| | | Partner company's page 2 | Information exchange meeting | EF Company, GH Company and our company will hold an information exchange meeting on induction heating cookers. We will give you our statistics such as industry trend. We hope you will join us.<br>When: 1:00 ~ 4:00 PM on 3rd next month<br>Where: Meeting room No. 6 at BB Center 4F |
| | | ... | ... | ... |

Fig. 10A  Category information (Category based on questionnaire information)  705a

| QuestionnaireID 123 | | |
|---|---|---|
| Question No. | Answer No. | Category |
| 1 | 1 | Kitchen appliance |
| | 2 | Computer |
| | 3 | Heavy electric device |
| | 4 | Communication device |
| | 5 | Precision device |
| 2 | 1 | Stock information |
| | 2 | Loan |
| | 3 | Saving |
| | 4 | Asset formation |
| | 5 | Real estate |
| 3 | 1 | Literature |
| | 2 | Gardening |
| | 3 | Culture |
| | 4 | Art |
| | 5 | Acrobatics |

Fig. 10B  Category information (Category based on purchase information)  705a

| Product number | Category |
|---|---|
| 1524 | Kitchen appliance |
| 3612 | Vacuum cleaner |
| 1010 | Washing machine |

Fig. 10C  Category information (Category based on questionnaire information and attribute)  705a

| QuestionnaireID 123 | | | |
|---|---|---|---|
| Question No. | Answer No. | Industry | Category |
| 1 | 1 | Home appliance | Kitchen appliance |
| | | Mail-order | Washing machine |
| | 2 | Manufacturing | Computer |
| | | Service | E-mail software |
| | 3 | Repair | Heavy electric device |
| | | Manufacturing | Elevator |
| | 4 | Distribution | Communication device |
| | | Service | Cell phone |
| | 5 | Manufacturing | Precision device |
| | | Distribution | Watch |
| 2 | | | |

Fig. 10D  Category information (Category based on log information)  705a

| Page number | Views | | Category |
|---|---|---|---|
| | Twice or more | Five minutes or more | |
| 5 | ○ | ○ | Stock information |
| | × | ○ | Stock information |
| | ○ | × | Economic information |
| | × | × | Non |
| 4 | ○ | ○ | Kitchen appliance |
| | × | × | Home electric appliance |
| | ○ | × | Home electric appliance |
| | × | × | Non |

Fig. 11

Prediction result information  _702a_

| Member ID | Predicted category | | | |
|---|---|---|---|---|
| 12345 | Kitchen appliance | Cell phone | Personal computer | Audio device |
| 12346 | Baseball fan | Stock information | Money management | Financial information |
| 12347 | Fishing | Climbing | Skiing | Travel |

Fig. 12

Dictionary information  _706a_

| Category | Keyword 1 | Keyword 2 | Keyword 3 |
|---|---|---|---|
| Kitchen appliance | Microwave oven | Rice cooker | Induction heating cooker |
| Baseball fan | The Givants | Professional baseball | Game result |
| Fishing | Fishing pond | Fishing in mountain stream | Fishing in the sea |

Fig. 13

Extraction result information

| Member ID | Company's own HP-URL | Keyword 1 | Keyword 2 | | Keyword n |
|---|---|---|---|---|---|
| 12345 | http://www.xx.denki.com/ | Microwave oven | Rice cooker | | Induction heating cooker |
| 12346 | http://www.yy.co.jp/ | The Givants | Professional baseball | | Game result |
| 12347 | http://www.zz.shoukai.ne.jp/ | Fishing pond | Fishing in mountain stream | | Fishing in the sea |
| | | | | | |
| | | | | | |
| | | | | | |

XX Electric.com

| Audio/Video | Personal computers | Kitchen appliances | Air conditioners | Health care | others |

Welcome to XX Electric!

[What's New]

◆ Kitchen appliances
- Advance sale of new AB microwave ovens (to be released on 10th next month)!
- Advance sale of new AB microwave ovens (Product No. Z12) starts.
- Special advance discount for purchase by the end of this month.

◆ Audio/Video
- CD digital camera best-buy campaign!
- Our gift voucher (2,000 yen) with purchase of CD digital camera (Product No. 89Z) during this week (voucher worth 2,000 yen for each person regardless of number of purchased cameras)

◆ Health care
- EF massager trial campaign!
- ......

●About us ●Business fields ●Map ●News ●Contact us ●Affiliated companies ●LINK

Fig. 16

Search Result Information                          707a

| Member ID | Keyword | Description |
|---|---|---|
| 12345 | Microwave oven | Advance sale of new AB microwave ovens |
|  |  | AB microwave ovens(Product No.Z12)..... discount...... |
|  | Rice cooker | Non |
|  | Induction heating cooker | Non |
| 12346 | The Givants | Free ticket of The Givants opening game |
|  | Professional baseball | Baseball season will open in 25 days |
|  | Game result | Non |
|  |  |  |

Fig. 17

Pattern information 710a

| Keyword | Relevant information | Service | | | | |
|---|---|---|---|---|---|---|
| | | E-mail 1 | E-mail 2 | ... | Partner company's page 1 | Partner company's page 2 |
| Microwave oven | Discount | Revised price (discount) information | Inventory clearance campaign | ... | New product information | Replacement advice |
| | Campaign | Advance sale of new products | Staff dispatch | ... | Color selection | Frozen food delivery service |
| | B Company | ... | ... | ... | ... | ... |
| | ... | ... | ... | ... | ... | ... |
| | ... | ... | ... | ... | ... | ... |
| Induction heating cooker | EF Company | New product briefing | Evaluation of our staff | ... | Questionnaire | Information exchange meeting |
| | Safe | ... | ... | ... | ... | ... |
| | Compact | ... | ... | ... | ... | ... |
| ... | ... | ... | ... | ... | ... | ... |

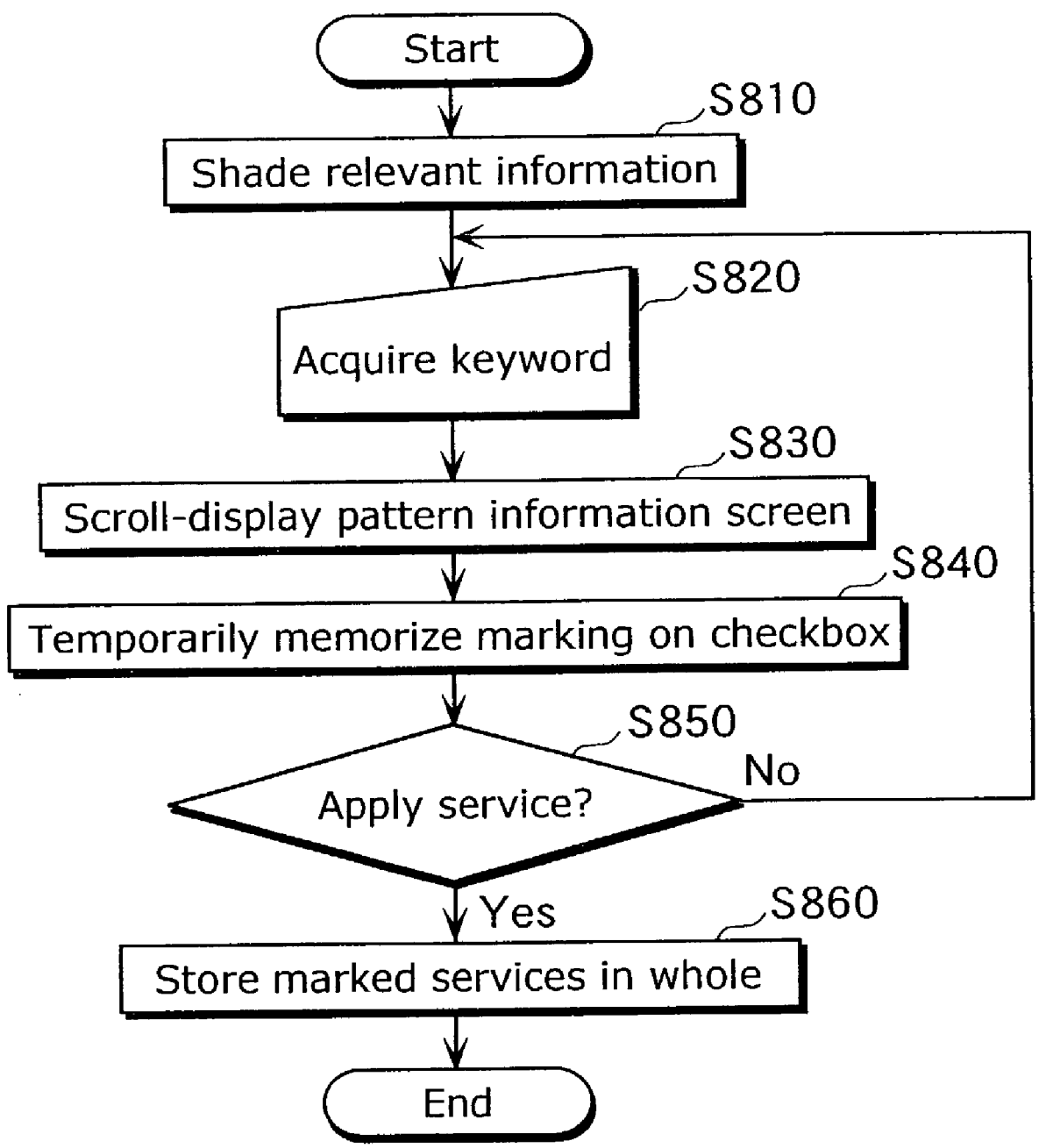

| Member ID:12345 | | | |
|---|---|---|---|
| Keyword | Relevant information | Service | |
| | | Means | Type |
| Microwave oven | Discount | E-mail 1 | Revised price (discount) information |
| | | E-mail 2 | Inventory clearance campaign |
| | | Partner company's page 1 | New product information |
| | | Partner company's page 2 | Replacement advise |
| Induction heating cooker | EF Company | E-mail 1 | New product briefing |
| | | E-mail 2 | Evaluation of our staff |
| | | Partner company's page 1 | Questionnaire |
| | | Partner company's page 2 | Information exchange meeting |

Fig. 22

Service Details Setting

Member ID: 12345

| Keyword | Relevant information | Check | Means |
|---|---|---|---|
| Microwave oven | Discount | ● | E-mail 1 |
| | | ○ | E-mail 2 |
| | | ● | Partner company's page 1 |
| | | | Partner company's |
| Induction heating cooker | EF Company | ○ | E-mail 1 |
| | | ○ | E-mail 2 |
| | | ● | Partner company's |
| | | ○ | Partner company's |

800A

| | | Service | |
|---|---|---|---|
| | | Type | |
| | | Revised price (discount) information | |
| | | Inventory clearance campaign | |
| | | New product information | |

860A

| Keyword | Relevant information | Means | Service Text |
|---|---|---|---|
| Microwave oven | Discount | E-mail 1 | We will revise (discount) the wholesale prices of microwave ovens...... |
| | | E-mail 2 | We will conduct inventory clearance campaign before release of new products next month. |
| | | Partner company's page 1 | We will hold a briefing of new microwave ovens with single function to be released in 3 months. |
| | | Partner company's page 2 | We will offer a service of electric expenses comparison between your microwave oven and a new one. |
| Induction heating cooker | EF Company | E-mail 1 | We will hold a briefing of new induction heating cookers to be released next month. |
| | | E-mail 2 | Please evaluate work behavior of our staff. |
| | | Partner company's page 1 | We will conduct questionnaire on induction heating cookers. |
| | | Partner company's page 2 | EF Company, GH Company and our company will hold an information exchange meeting on induction heating cookers. |

Return    OK

Fig. 23

Member ID: 12345    605b

| Keyword | Relevant information | Service | | |
|---|---|---|---|---|
| | | Means | Type | Text |
| Microwave oven | Discount | E-mail 1 | Revised price (discount) information | We will revise (discount) wholesale prices of microwave ovens. Product number:X54321, Y64321 When: For products delivered on and after 1st next month New price: Our staff will inform you at his visit. |
| | | Partner company's page 1 | New product information | We will hold a briefing of new microwave ovens with single function to be released in 3 months. Please select your convenient date from among the following dates. Product number:c01266(Product number may be changed before release) When: 15th or 17th of next month Where: Our staff will visit you. |
| Induction heating cooker | EF Company | Partner company's page 1 | Questionnaire | No change |

Fig. 24

Service Selection Result

Member ID: 12345

810A

| Keyword | Relevant information | Means | Service Type | Service Text |
|---|---|---|---|---|
| Microwave oven | Discount | E-mail 1 | Revised price (discount) information | We will revise (discount) wholesale prices of microwave ovens.... Product number: X54321, Y64321 When: ... New price: ... |
| | | Partner company's page 1 | New product information | We will hold a briefing of new microwave ovens with single function to be released in 3 months.... Product number: ... When: 15th or 17th of next month Where: ... |
| Induction heating cooker | EF Company | Partner company's page 1 | Questionnaire | No change |

[Return]  [Decide Services]

Fig. 26

Questionnaire

Member ID: 12345  To: XX Electric Company
We thank you very much for your continued patronage.
Please answer the following questionnaire on induction heating cookers.
Thank you very much for your cooperation.

850

| No. | Question | Answer 1 | Answer 2 | Answer 3 | Answer 4 | Answer 5 |
|---|---|---|---|---|---|---|
| 1 | Are you dissatisfied with induction heating cookers? | Considerably ○ | A little ○ | Moderately ○ | Satisfied ○ | Fully satisfied ○ |
| 2 | Are low prices attractive? | Very attractive ○ | Attractive ● | Moderately ○ | Not attractive ○ | Not attractive at all ○ |
| 3 | Are you interested in multiple functions? | Very interested ○ | Interested ○ | Moderately ● | Not interested ○ | Not interested at all ○ |

Return    OK

Fig. 29

Member information 109a

| Member ID | Name | Address | Sex | Age | Occupation | Member's own HP - URL | Password | Birth date |
|---|---|---|---|---|---|---|---|---|
| 123456 | Yuichi Matsushita | 1111 Shiromi Chuo-ku, Osaka-shi | Male | 21 | Office worker | http://www.matsushita.xx.ne.jp/ | xyz001 | 19810203 |
| 123457 | Yuji Matsushita | 1234 Kadoma Oaza Kadoma-shi | Male | 31 | Office worker | http://www.yy.sonic.ne.jp/ | opq987 | 19711025 |
| 123458 | Yuzo Takeshita | 1-1 Korakuen Minato-ku, Tokyo | Male | 41 | Doctor | http://www.abc.pana.co.jp/ | abc154 | 19610517 |
| 123459 | Yuko Umeshita | 1-2 Naminami-ku Kawasaki-shi, Kanagawa | Female | 51 | Public servant | http://home.hi-hi.ne.jp/ | ef1632 | 19510131 |

Fig. 30A

Log information (Number of views)

| Member ID 123456 | |
|---|---|
| Date | Page |
| | Type |
| 2002/3/5 | News |
| 2002/3/10 | Weather report |
| 2002/3/11 | Recipe |
| 2002/3/12 | Home electric appliances information |
| | |

Fig. 30B

Log information (Time duration)

| Member ID 123456 | |
|---|---|
| Date & Time | Page |
| | Type |
| 2002/3/5 11:15 | News |
| 2002/3/10 15:30 | Weather report |
| 2002/3/11 15:30 | Recipe |
| 2002/3/12 15:30 | Home electric appliances information |
| | |

Fig. 31A

Service history information
(Questionnaire information)

| Member ID 123456 | | | | | | |
|---|---|---|---|---|---|---|
| Questionnaire ID 123 | | | | | | 108a |
| Question No. | Answer 1 | Answer 2 | Answer 3 | Answer 4 | Answer 5 | Others |
| 1 | ○ | | | | | |
| 2 | | | | ○ | | |
| 3 | | | ○ | | | |
| 4 | | ○ | | | | |
| | | | | | | |
| | | | | | | |

Fig. 31B

Service history information
(Purchase information)

| Member ID 123456 | | | | | 108b |
|---|---|---|---|---|---|
| Date | Model number | Price | Number of purchased products | Method of payment | Accumulated points |
| 1998/3/1 | 7321 | 1200 | 6 | Credit | 123 |
| 2000/3/2 | 1001 | 1500 | 5 | Payment on delivery | 234 |
| 2001/5/5 | 2003 | 2980 | 4 | Credit | 534 |
| 2002/2/28 | 1003 | 500 | 3 | Payment on delivery | 634 |
| | | | | | |
| | | | | | |

Fig. 32

Service information 105a

| Keyword | Relevant information | Service | | |
|---|---|---|---|---|
| | | Means | Type | Text |
| Micro-wave oven | Want | E-mail 1 | Point plan information | You have accumulated more than 100 points. You can exchange these points for a microwave oven. Will you apply for it? |
| | | E-mail 2 | Bargain Information | We will offer our microwave ovens at substantially reduced prices. How would you like it? |
| | | Personal page 1 | Point Plan Information | You have accumulated more than 100 points. You can exchange these points for a microwave oven. Will you apply for it? |
| | | Personal page 2 | Bargain Information | We will offer our microwave ovens at substantially reduced prices. How would you like it? |
| | | ⋮ | ⋮ | |
| | Want to buy | E-mail 1 | Product information | We have a wide choice of microwave ovens of various manufacturers. How about GG microwave oven? |
| | | E-mail 2 | Campaign information | Big bargain sale! |
| | | Personal page 1 | Product information | We have a wide choice of microwave ovens of various manufacturers. How about HH microwave oven? |
| | | Personal page 2 | Campaign information | Big bargain sale! |
| | | ⋮ | ⋮ | . |
| Induction heating cooker | Cheap | E-mail 1 | Product information | We have a wide choice of induction heating cookers of various manufacturers. How about II induction heating cooker? |
| | | E-mail 2 | Campaign information | Big bargain sale starts on April 1! |
| | | Personal page 1 | Questionnaire | Are you dissatisfied with induction heating cookers? / Are low prices attractive? |
| | | Personal page 2 | Additional points | If you answer the questionnaire, we will offer additional 10 points. |
| | | ⋮ | ⋮ | |

Fig. 33A  Category information (Category based on questionnaire information) 205a QuestionnaireID 123

| Question No. | Answer No. | Category |
|---|---|---|
| 1 | 1 | Kitchen appliance |
| | 2 | Computer |
| | 3 | Heavy electric device |
| | 4 | Communication device |
| | 5 | Precision device |
| 2 | 1 | Stock information |
| | 2 | Loan |
| | 3 | Saving |
| | 4 | Asset formation |
| | 5 | Real estate |
| 3 | 1 | Literature |
| | 2 | Gardening |
| | 3 | Culture |
| | 4 | Art |
| | 5 | Acrobatics |

Fig. 33B  Category information (Category based on purchase information) 205a

| Model number | Category |
|---|---|
| 1001 | Kitchen appliance |
| 1002 | Vacuum cleaner |
| 1003 | Washing machine |
| 1004 | Digital camera |
| 1005 | Personal computer |
| 1006 | Video player |

Fig. 33C  Category information (Category based on questionnaire information and attributes) 205a QuestionnaireID 123

| Question No. | Answer No. | Sex | Category |
|---|---|---|---|
| 1 | 1 | Male | Kitchen appliance |
| | | Female | Washing machine |
| | 2 | Male | Computer |
| | | Female | E-mail software |
| | 3 | Male | Heavy electric device |
| | | Female | Elevator |
| | 4 | Male | Communication device |
| | | Female | Cell phone |
| | 5 | Male | Precision device |
| | | Female | Watch |
| 2 | | | |

Fig. 33D  Category information (Category based on log information) 205a

| Page number | Views | | Category |
|---|---|---|---|
| | Twice or more | Five minutes or more | |
| 5 | ○ | ○ | Stock information |
| | × | ○ | Stock information |
| | ○ | × | Economic information |
| | × | × | Non |
| 4 | ○ | ○ | Kitchen appliance |
| | × | ○ | Home electric appliance |
| | ○ | × | Home electric appliance |
| | × | × | Non |

Fig. 34

Prediction result information / 202a

| Member ID | Predicted category | | |
|---|---|---|---|
| 123456 | Kitchen appliance | Cell phone | Personal computer | Audio device |
| 123457 | Baseball fan | Stock information | Money management | Financial information |
| 123458 | Fishing | Climbing | Skiing | Travel |
| 123459 | Literature | Tea ceremony | Flower arrangement | |

Fig. 35

Dictionary information / 206a

| Category | Keyword 1 | Keyword 2 | Keyword 3 |
|---|---|---|---|
| Kitchen appliance | Microwave oven | Rice cooker | Induction heating cooker |
| Baseball fan | The Givants | Professional baseball | Game result |
| Fishing | Fishing pond | Fishing in mountain stream | Fishing in the sea |
| Travel | Luxury travel | Economical travel | Journey round the world |

Fig. 36

Extraction result information

| Member ID | Member's own HP - URL | Keyword 1 | Keyword 2 | ... | Keyword n |
|---|---|---|---|---|---|
| 123456 | http://www.matsushita.xx.ne.jp/ | Microwave oven | Rice cooker | | Induction heating cooker |
| 123457 | http://www.yy.sonic.ne.jp/ | The Givants | Professional baseball | | Game result |
| 123458 | http://www.abc.pana.co.jp/ | Fishing pond | Fishing in mountain stream | | Fishing in the sea |
| 123459 | http://home.hi-hi.ne.jp/ | Luxury travel | Economical travel | | Journey around the world |

Search Result Information 207a

| Member ID | Keyword | Description |
|---|---|---|
| 123456 | Microwave oven | I want a microwave oven |
|  |  | I want to buy a microwave oven with single function |
|  |  | I think microwave ovens are convenient |
|  | Rice cooker | Non |
|  | Induction heating cooker | Are induction heating cookers convenient? |
|  |  | I wonder whether to buy an induction heating cooker? |
| 123457 | The Givants | The Givants are strong |
|  | Professional baseball | Non |
|  | Game result | Game result is good |
|  |  |  |

Fig. 40

| Keyword | Pattern information | Service | | | | |
|---|---|---|---|---|---|---|
| | Relevant information | E-mail 1 | E-mail 2 | ... | Personal page 1 | Personal page 2 |
| Microwave oven | Want | Point plan information | Bargain information | | Point plan information | Bargain information |
| | Want to buy | Product information | Campaign information | | Product information | Campaign information |
| | Want to sell | Purchase service | Campaign information | | Purchase service | Campaign information |
| | Single function | Purchaser report service | Brochure service | | Campaign information | Questionnaire |
| | Multiple functions | Purchaser report service | Brochure service | | Questionnaire | Additional point |
| | With grill | Campaign information | Product information | | Questionnaire | Additional point |
| | Cheap | | | | | |
| | Safe | | | | | |
| | Compact | | | | | |
| | Microwave oven | | | | | |
| | Induction heating cooker | | | | | |
| | Personal computer | | | | | |
| | Camera | | | | | |
| | Video player | | | | | |
| Induction heating cooker | | | | | | |
| Want | | | | | | |

| Member ID:123456 | | | |
|---|---|---|---|
| Keyword | Relevant information | Service 209a | |
| | | Means | Type |
| Microwave oven | Want | E-mail 1 | Point plan information |
| | | E-mail 2 | Bargain information |
| | | Personal page 1 | Point plan information |
| | | Personal page 2 | Bargain information |
| Induction heating cooker | Cheap | E-mail 1 | Purchaser report service |
| | | E-mail 2 | Campaign information |
| | | Personal page 1 | Questionnaire |
| | | Personal page 2 | Trade-in campaign |

Fig. 45

Service Details Setting

Member ID:123456

300A

| Keyword | Relevant information | Check | Service | |
|---|---|---|---|---|
| | | | Means | Type |
| Microwave oven | Want | ● | E-mail 1 | Point plan information |
| | | ○ | E-mail 2 | Bargain information |
| | | ● | Personal page 1 | Point plan information |
| | | ○ | Personal page 2 | |
| Induction heating cooker | Cheap | ○ | E-mail 1 | |
| | | ○ | E-mail 2 | |
| | | ● | Personal page 1 | |
| | | ○ | Personal page 2 | |

360A

| Keyword | Relevant information | Service | |
|---|---|---|---|
| | | Means | Text |
| Microwave oven | Want | E-mail 1 | You have accumulated more than 100 points. You can exchange these points for a microwave oven. Will you apply for it? |
| | | E-mail 2 | We will offer our microwave ovens at substantially reduced prices. How would you like it? |
| | | Personal page 1 | You have accumulated more than 100 points. You can exchange these points for a microwave oven. Will you apply for it? |
| | | Personal page 2 | We will offer our microwave ovens at substantially reduced prices. How would you like it? |
| Induction heating cooker | Cheap | E-mail 1 | We have a wide choice of microwave ovens of various manufacturers. How about HH microwave oven? |
| | | E-mail 2 | Big bargain sale starts on April 1! |
| | | Personal page 1 | Are you dissatisfied with induction heating cookers? / Are low price attractive? |
| | | Personal page 2 | If you answer the questionnaire, we will offer additional 10 points. |

OK   Return

Fig. 46

| Member ID:123456 | | | | |
|---|---|---|---|---|
| Keyword | Relevant information | Service | | |
| | | Means | Type | Text |
| Microwave oven | Want | E-mail 1 | Point plan information | You have accumulated more than 120 points. You can exchange these points for a microwave oven with grill. Will you apply for it? |
| | | Personal page 1 | Point plan information | You have accumulated more than 120 points. You can exchange these points for a microwave oven with grill or a microwave oven with single function. Will you apply for it? |
| Induction heating cooker | Cheap | Personal page 1 | Questionnaire | No change |

Fig. 47

Service Selection Result

Member ID:123456

310A

| Keyword | Relevant Information | Means | Service Type | Service Text |
|---|---|---|---|---|
| Microwave oven | Want | E-mail 1 | Point plan information | You have accumulated more than 120 points. You can exchange these points for a microwave oven with grill. Will you apply for it? |
| | | Personal page 1 | Point plan information | You have accumulated more than 120 points. You can exchange these points for a microwave oven with grill or a microwave oven with single function. Will you apply for it? |
| Induction heating cooker | Cheap | Personal page 1 | Questionnaire | No change |

Return

Decide Services

Fig. 48

Header _____ 320
- - - - - - - - - - - - - - - - -
Dear Mr. Yuichi Matsushita
We thank you very much for
your continued patronage.
- - - - - - - - - - - - - - - - -

Text _____ 330
- - - - - - - - - - - - - - - - -
You have accumulated more than
100 points. You can exchange
these points for a microwave
oven. Will you apply for it?
- - - - - - - - - - - - - - - - -

Footer _____ 340
- - - - - - - - - - - - - - - - -
Contact us
   XYZ Electric Corporation
     1 Chiyoda-ku, Tokyo
     Tel: 03-3221-1234
     E-mail: abc@abcd.ne.jp
- - - - - - - - - - - - - - - - -

Fig. 49

Questionnaire

Member ID: 123456  Dear Mr. Yuichi Matsushita
We thank you very much for your continued patronage.
If you answer the questionnaire, we will offer additional 10 points.
Thank you very much for your cooperation.

350

| No. | Question | Answer 1 | Answer 2 | Answer 3 | Answer 4 | Answer 5 |
|---|---|---|---|---|---|---|
| 1 | Are you dissatisfied with induction heating cookers? | Considerably ○ | A little ○ | Moderately ● | Satisfied ○ | Fully satisfied ○ |
| 2 | Are low prices attractive? | Very attractive ○ | Attractive ● | Moderately ○ | Not attractive ○ | Not attractive at all ○ |
| 3 | Are you interested in multiple functions? | Very interested ○ | Interested ○ | Moderately ● | Not interested ○ | Not interested at all ○ |

Return    OK

SERVICE PROVIDING DEVICE AND SERVICE PROVIDING METHOD

BACKGROUND OF THE INVENTION (1) Field of the Invention

The present invention relates to a device and method for providing services at a members-only type website or the like via a network.

(2) Description of the Related Art

Service providing devices have been traditionally introduced for providing, via the Internet, registered members (such as corporate and individual customers) with services such as information services including product sales, repair acceptance and product advertising at a website for EC (Electronic Commerce) of selling products to the members via the Internet.

This type of a service providing device, which corresponds to a server connected via the Internet to terminals such as personal computers used by individual members at home, for instance, provides the above-mentioned services such as product advertising.

The server (the service providing device) sends out questionnaires to the members and analyzes the results. The service provider who manages the server predicts the services the members are most likely to want based on the analysis, and provides the predicted services to the members through the server.

For example, if the service provider predicts that the member wants to receive the information service on "microwave ovens" based on the analysis of his questionnaire answers, the provider sends the information on "microwave ovens" to the member's terminal by e-mail through the server.

However, the conventional service providing device cannot make adequate analysis because the analysis is based on only the questionnaire results and the like. Therefore, the service provider cannot predict accurately what kind of information on microwave ovens the member is likely to want, and thus provides information unnecessary for the member or cannot provide information necessary for the member. This is a problem.

SUMMARY OF THE INVENTION

In view of the above-mentioned problem, the present invention aims at providing a service providing device and a service providing method capable of predicting accurately the services the customers are most likely to want so as to provide the services for the customers with great satisfaction.

In order to achieve the above-mentioned object, the service providing device according to the present invention is a service providing device that is connected to a terminal device via a communication network. The service includes at least information distribution to a customer who uses the terminal device. The service providing device comprises the features noted below. The services providing device includes an information holding unit operable to acquire from the terminal device customer-specific information including location information indicating a location of a website owned by the customer and hold the customer-specific information. Additionally, a deriving unit is operable to derive an orientation area of the customer based on the customer-specific information; and a description extracting unit is operable to access the website using the location information and extract from the website an orientation area description belonging to the orientation area derived by said deriving unit.

Accordingly, since the orientation area descriptions belonging to the customer's orientation area are extracted from the customer's own website, the service provider who is to provide services for the customer can accurately predict the services the customer wants to receive based on the extracted orientation area descriptions, and thus provide the services to the customer with great satisfaction. As a result, unnecessary information service for the customer can be prevented, and thus the communication load and power consumption can be reduced.

Here, the customer-specific information is company-specific information, the customer is a company, and the orientation area is a purchase orientation area.

Accordingly, the service provider can accurately predict the services the company wants to receive on their purchase based on the extracted orientation area descriptions, and thus provide the services to the company with great satisfaction.

Also, the customer-specific information is person-specific information, the customer is a person, the orientation area is an interest area, and the orientation area description is an interest area description.

Accordingly, the service provider can accurately predict the services the person wants to receive on his interest area based on the extracted interest area descriptions, and thus provide the services to the person with great satisfaction.

Further, the service providing device may comprise a displaying unit operable to display the interest area description extracted by said description extracting unit. Accordingly, the service provider can easily grasp the extracted interest area description on the displaying unit.

The service providing device according to the present invention further comprises: a dictionary information holding unit operable to hold dictionary information which stores a plurality of interest areas and keywords, each of which belongs to one of the interest areas; and a keyword extracting unit operable to search the dictionary information held by said dictionary information holding unit for a keyword belonging to the interest area derived by said deriving unit and extract the keyword, wherein said description extracting unit is operable to search the website for a keyword identical to the keyword extracted by said keyword extracting unit, and is operable to extract a description including the keyword as the interest area description. For example, said description extracting unit is operable to extract from the website a keyword and a predetermined number of letters preceding the keyword as the interest area description.

Accordingly, since the description extracting unit searches the person's own website for keywords belonging to the interest area so as to extract the description including the keywords, it can extract the description belonging to the interest area described on the person's website accurately and without omission.

The service providing device according to the present invention may further comprise: a service information holding unit operable to hold service information which stores in advance a plurality of sentences which can be provided to the person; and a providing unit operable to select any of the plurality of sentences stored in said service information and provide the selected sentence to the person.

Accordingly, since the providing unit selects the sentences stored in the service information to provide them to the person, there is no need to create such sentences from scratch based on the services for the member predicted by the service provider, and thus the services can be easily provided.

Also, the service providing device according to the present invention may further comprise: a service specifying unit operable to specify a service which is to be provided to the person; a summary information holding unit operable to hold summary information which stores a plurality of summaries, each of which corresponds to one of the sentences stored in the service information; a summary displaying unit operable to display the plurality of summaries stored in the summary information; and a selecting unit operable to select any of the plurality of summaries based on a specification by said service specifying unit, wherein said providing unit is operable to select a sentence corresponding to the summary selected by said selecting unit and provide the selected sentence to the person.

Accordingly, since the summary displaying unit displays the summary of each sentence stored in the service information, the service provider can easily grasp the sentences stored in the service information. Then, the selecting unit selects any of the summaries stored in the summary information based on the specification by the service specifying unit, and the providing unit selects the texts corresponding to the selected summary to provide for the person, and thus the service provider can easily provide the services only by operating the service specifying unit.

In addition, the service providing device according to the present invention may further comprise a providing method selecting unit operable to select a method of providing the sentence selected from the service information by at least one of by e-mail and a person-only website having the sentence posted thereon, wherein said providing unit is operable to provide the sentence selected from the service information to the person based on the selection by said providing method selecting unit.

Accordingly, the methods for providing services can be selected, and thus usability can be improved.

Note that the present invention can be realized as a method for providing services, or realized as a program for causing a computer to execute the steps of the method for distribution via a recording medium such as a CD-ROM or a transmission medium such as the Internet.

As further information about technical background to this application, Japanese Patent Application No. 2002-133272, filed May 8, 2002, is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a table showing member information of the first embodiment.

FIGS. 5A and 5B are tables showing log information of the first embodiment.

FIG. 6A is a table showing questionnaire information of the first embodiment, and FIG. 6B is a table showing purchase information of the first embodiment.

FIG. 7 is a table showing a part of service information of the first embodiment.

FIG. 8 is a table showing another part of the service information of the first embodiment.

FIG. 9 is a table showing still another part of the service information of the first embodiment.

FIGS. 10A~10D are tables showing category information of the first embodiment.

FIG. 11 is a table showing prediction result information of the first embodiment.

FIG. 12 is a table showing dictionary information of the first embodiment.

FIG. 13 is a table showing extraction result information of the first embodiment.

FIG. 15 is a page display showing an example of the company's own home page of the first embodiment.

FIG. 16 is a table showing search result information of the first embodiment.

FIG. 17 is a table showing pattern information of the first embodiment.

FIG. 20 is a flowchart showing operation performed when the service selection menu screen is displayed in the first embodiment.

FIG. 21 is a table showing selection result information of the first embodiment.

FIG. 22 is a screen display showing a service details setting screen of the first embodiment.

FIG. 23 is a table showing editing result information of the first embodiment.

FIG. 24 is a screen display showing a service selection result screen of the first embodiment.

FIG. 26 is a screen display showing a questionnaire screen of the first embodiment.

FIG. 29 is a table showing member information of the second embodiment.

FIGS. 30A and 30B are tables showing log information of the second embodiment.

FIG. 31A is a table showing questionnaire information of the second embodiment, and FIG. 31B is a table showing purchase information of the second embodiment.

FIG. 32 is a table showing a part of service information of the second embodiment.

FIGS. 33A~33D are tables showing category information of the second embodiment.

FIG. 34 is a table showing prediction result information of the second embodiment.

FIG. 35 is a table showing dictionary information of the second embodiment.

FIG. 36 is a table showing extraction result information of the second embodiment.

FIG. 39 is a table showing search result information of the second embodiment.

FIG. 40 is a table showing pattern information of the second embodiment.

FIG. 44 is a table showing selection result information of the second embodiment.

FIG. 45 is a screen display showing a service details setting screen of the second embodiment.

FIG. 46 is a table showing editing result information of the second embodiment.

FIG. 47 is a screen display showing a service selection result screen of the second embodiment.

FIG. 48 is a diagram for explaining sentences inserted in an e-mail in the second embodiment.

FIG. 49 is a screen display showing a questionnaire screen of the second embodiment.

DESCRIPTION OF THE PREFERRED
EMBODIMENT(S)

First Embodiment

The service providing device according to the first embodiment of the present invention will be explained below with reference to the figures. It is noted that the operation of the service providing device can be implemented by the service providing device executing a computer program comprising program code associated with a service providing method.

Figure 1:
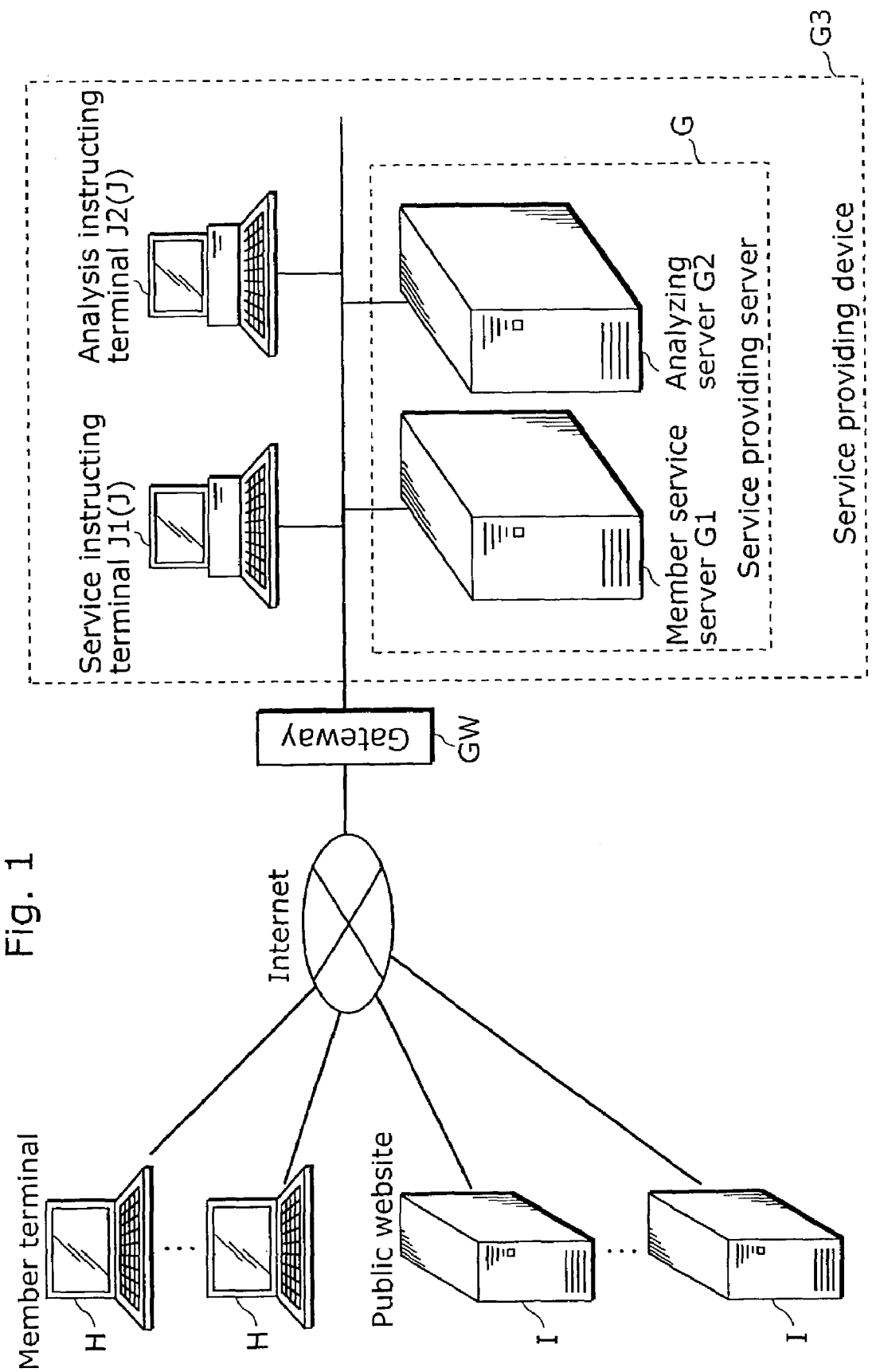
FIG. 1 is a diagram showing a system configured using a service providing device of a first embodiment of the present invention.

FIG. 1 is a diagram showing a system configured using a service providing device of a first embodiment of the present invention.

This system includes a service providing device G3 of the present embodiment, member terminals H such as personal computers for performing desired information processing under the operation of members (company persons in charge) and public websites I for making the member companies' own home pages public via the Internet, and the service providing device G3 is connected to the member terminals H and the public websites I via the gateway GW and the Internet.

This service providing device G3, which is a device capable of predicting accurately services which corporate members are most likely to want by communicating with the member terminals H and the public websites I in the above-mentioned system so as to provide the services with great satisfaction as members, includes a service providing server G and an instructing terminal device J. The service providing server G is comprised of a member service server G1 and an analyzing server G2 which hold information specific to the members for providing services such as sales advertisements of products, and the instructing terminal device J gives desired instructions to the service providing server G under the operation of the service provider. The instructing terminal device J is comprised of a service instructing terminal J1 which instructs the start of providing services and an analysis instructing terminal J2 which instructs the analyzing server G2 to analyze the information specific to the members for predicting the services the members are likely to want. And the member service server G1, the analyzing server G2, the service instructing terminal J1, and the analysis instructing terminal J2 are respectively connected to each other via a LAN (Local Area Network) or the like.

Figure 2:
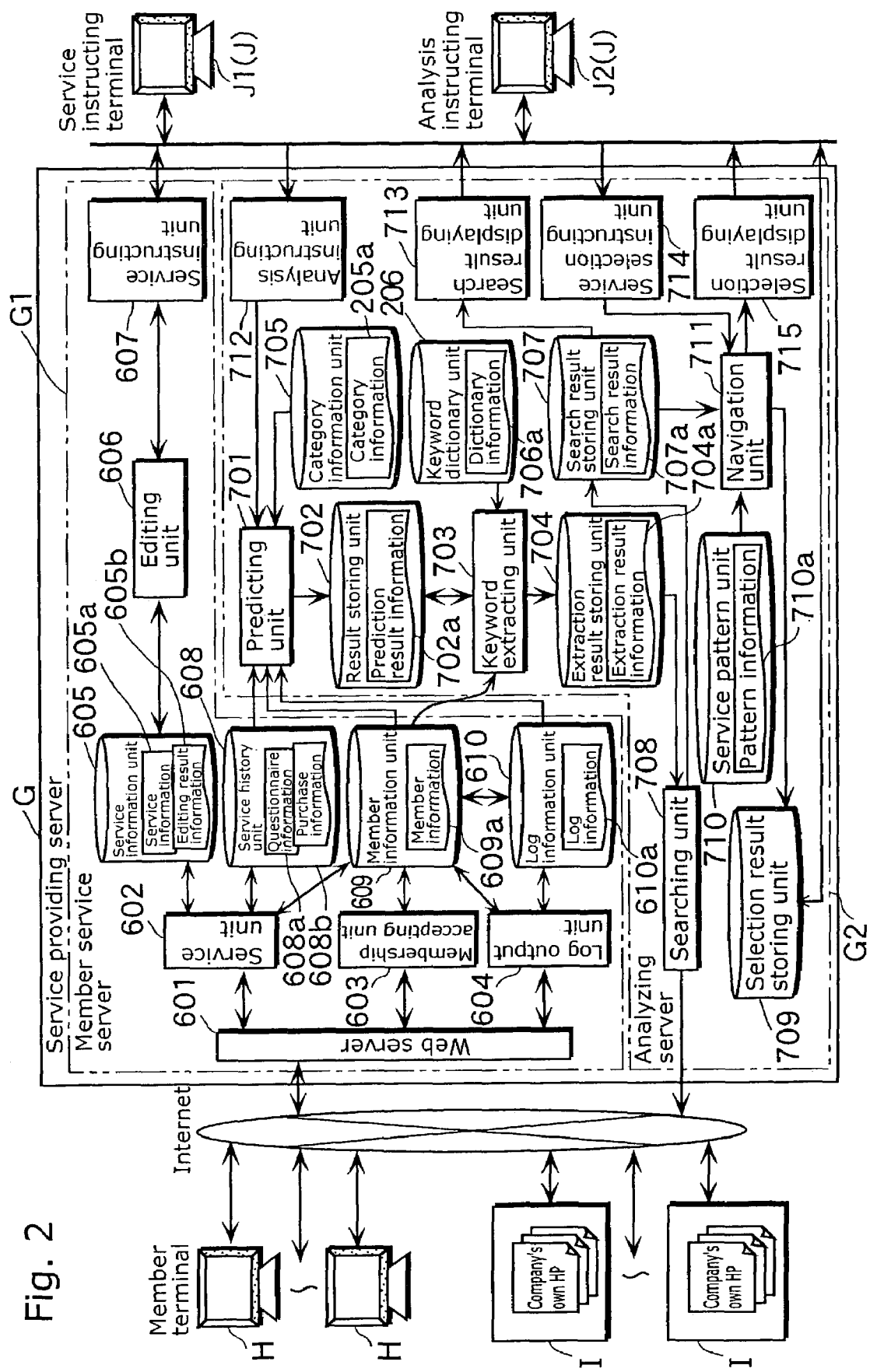
FIG. 2 is a block diagram showing a functional structure of a member service server and an analyzing server in the service providing device of the first embodiment.

FIG. 2 is a block diagram showing the functional structure of the member service server G1 and the analyzing server G2 in the service providing device G3.

Here, the above-mentioned information specific to the members includes member information (corporate information) 609a of corporate members which is obtained at the membership registration, such as their identification information, the URLs (Uniform Resource Locator) indicating their home pages, persons in charge and industry types; log information 610a on which the logs of the WWW pages accessed by the members (persons in charge of the companies) are recorded; and service history information such as questionnaire results.

The member service server G1 holds the information specific to the members and provides services via e-mail and the like, and the analyzing server G2 holds dictionary information 706a storing one or more keywords belonging to one or more categories and analyzes the information specific to the members using the dictionary information 706a.

The overall operation of this service providing device G3 will be explained with reference to FIG. 3.

Figure 3:
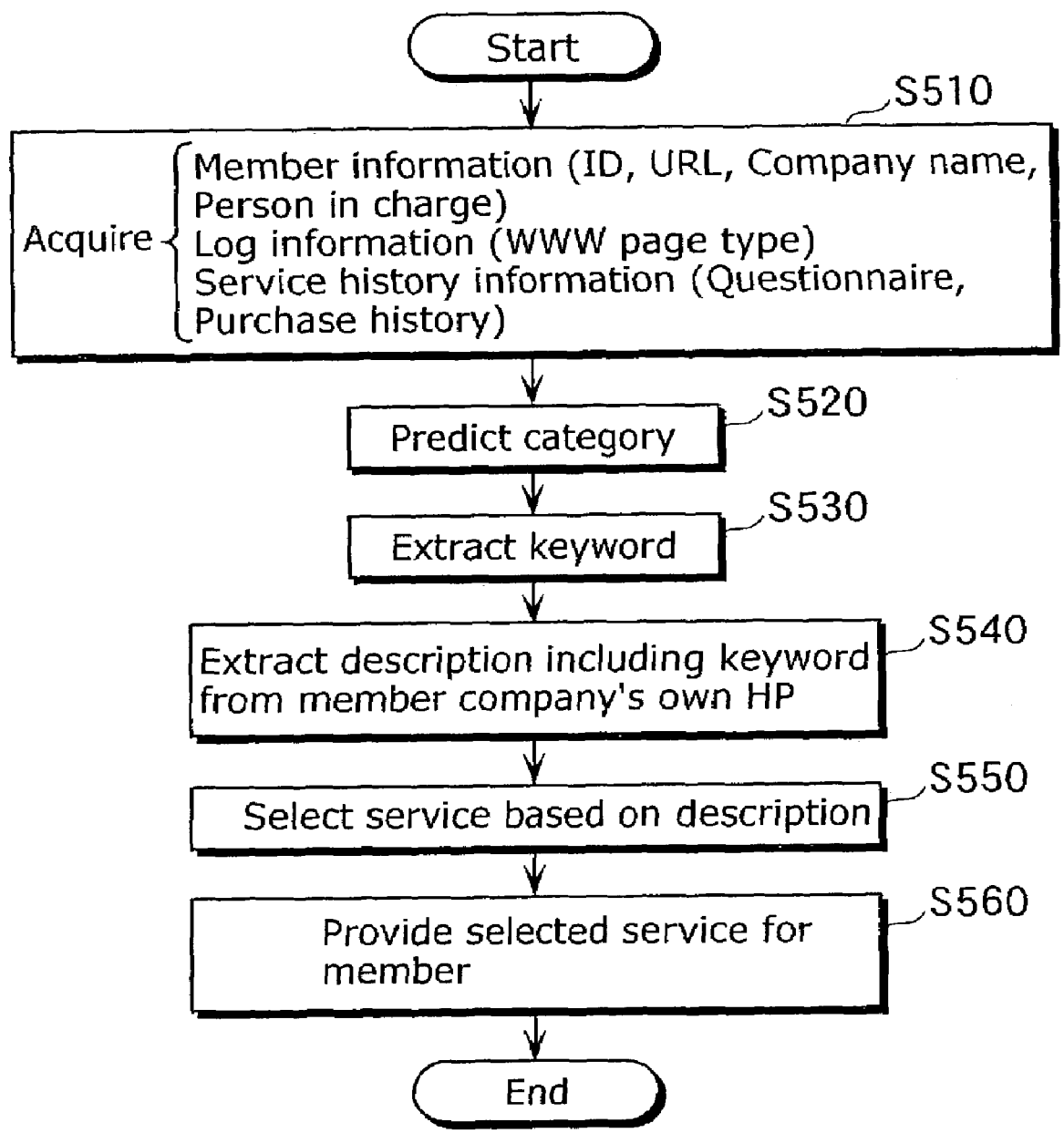
FIG. 3 is a flowchart showing overall operation in the first embodiment.

FIG. 3 is a flowchart showing the overall operation of the service providing device G3 in the present embodiment.

First, when the service provider operates to instruct the analysis instructing terminal J2 to analyze the information specific to a member such as the member information 609a, the log information 610a and the service history information, the analyzing server G2 acquires the information specific to the member from the member service server G1 based on the instruction from the analysis instructing terminal J2 (Step S510), and predicts a category of the member's orientation area on purchase based on the acquired information (Step S520).

Next, the analyzing server G2 searches the dictionary information 706a for keywords corresponding to the predicted category and extracts them (Step S530). Then, the analyzing server G2 accesses the company's own home page based on the URL included in the member information 609a, searches the company's home page for the extracted keywords, and extracts the descriptions including the keywords from the company's home page as descriptions indicating the member's purchase orientation area (orientation area descriptions) (Step S540).

Here, the service provider displays the extracted descriptions on the analysis instructing terminal J2 functioning as a display means, predicts the services the member is likely to want, and operates the analysis instructing terminal J2 so as to make the analyzing server G2 to select the services (Step S550).

Then, the service instructing terminal J1 has the analyzing server G2 notify the member service server G1 of the selection result based on the operation of the service provider, and upon receipt of the notification, the member service server G1 provides the member with the selected services (Step S560).

In the present embodiment, the URL of the company's home page included in the member information 609a is obtained with the member's consent. In the present embodiment, before obtaining the URL, the intended use of the URL is told to the member without fail, saying, for example, that "The URL you are to enter will be used for accurately predicting the services you want based on the descriptions on your home page and providing the services for you with great satisfaction. If you consent to this use of the URL, please enter the URL." Only with the consent of the member to the intended use of the URL, the descriptions on the company's own home page are extracted.

The service providing server G structured as above will be explained below in detail.

As shown in FIG. 2, the member service server G1 includes the features noted below. Specifically, a Web server 601 manages input and output of communication signals via the Internet. A membership accepting unit 603 encourages companies (persons in charge) who access from the member terminal H via the Web server 601 to register their membership and accept the registration. A member information unit 609 stores the member information collected by the membership accepting unit 603 as the above-mentioned member information 609a; and a service unit 602 provides the services for the members, such as sales of products, acceptance of repairs, information service by e-mail or the like, and questionnaire requests, via the Web server 601. A service history unit 608 stores the service histories supplied from the service unit 602 as the above-mentioned service history information; and a log output unit 604 extracts the logs of the WWW pages of the members who have accessed and outputting them. A log information unit 610 stores the logs outputted from the log output unit 604 as the log information 610a. The service unit 602, the membership accepting unit 603, the log output unit 604, the service history unit 608, the member information unit 609 and the log information unit 610 make up an information holding means.

The member service server G1 further includes a service instructing unit 607 for communicating with the service instructing terminal J1 for controlling the service unit 602 and an after-mentioned editing unit 606 depending upon the output from the service instructing terminal J1. A service information unit 605 holds service information 605a stores a plurality of registered sentences (hereinafter referred to as "texts") which can be supplied from the service unit 602 and are to be inserted in the above-mentioned e-mail or the like. The service information unit 605 also edits and editing result information 605b that is the modified service information 605a. The editing unit 606 edits the texts stored in the service information 605a based on the control signals outputted from the service instructing terminal J1 via the service instructing unit 607 so as to create or update the above-mentioned editing result information 605b.

FIG. 4 is a table showing the above-mentioned member information 609a.

The member information 609a includes member IDs, that is, identification information of respective members, attributes of the members such as their company names, persons in charge, and industry types, passwords specific to the members, and URLs indicating the locations of their home pages. Note that in the present embodiment, the URLs included in the member information 609a are obtained with the consent of the members.

In the present embodiment, above-mentioned information such as the member company names and persons in charge are included in the member information 609a, but the present invention is not limited to those items, numbers of employees, amounts of sales, numbers of stores, for instance, may be included.

FIG. 5A is a table showing the log information 610a storing the numbers of views of WWW pages summed up.

The log information 610a, which is summed up by each member, that is, each member ID, based on the output from the log output unit 604, includes the dates, the types of the WWW pages viewed on every date, the numbers associated with the types, and the numbers of views of the WWW pages on that date.

The log information 610a as shown in FIG. 5A includes the numbers of views of the WWW pages which are summed up by each date, but may include the dates and times of the WWW page views and the time durations thereof.

FIG. 5B is a table showing the log information 610a which includes the time durations of viewing the WWW pages.

This log information 610a is summed up by each member ID, as is the case of the log information 610a shown in FIG. 5A. The log information 610a includes the dates and times, the types of the WWW pages viewed on every date, the numbers associated with the types, and the time durations of viewing the WWW pages on that date.

The numbers of views accumulated on a daily basis are stored in the log information as shown in FIG. 5A of the present embodiment, but the present invention is not limited to that, and the numbers accumulated on an hourly basis or a weekly basis may be stored. Similarly, the viewing time durations are stored in the log information as shown in FIG. 5B in minutes, but the present invention is not limited to that, and they may be stored in seconds. Both the numbers of views and the viewing time durations may be stored.

FIGS. 6A and 6B are tables showing the service history information.

The service history information includes questionnaire information 608a including the results of the questionnaires for the members sent by the service unit 602, and purchase information 608b including the histories of the members' accesses to the service unit 602 to purchase the products. These questionnaire information 608a and purchase information 608b are created by the service unit 602 and updated at every questionnaire or purchase of the product.

As shown in FIG. 6A, this questionnaire information 608a, which is summed up by each member ID of the member who answered the questionnaire and by each questionnaire ID for identifying each questionnaire, includes the question numbers assigned to respective questions of the questionnaire and the answers to the corresponding questions with the numbers.

For example, the questionnaire information 608a shown in FIG. 6A stores the information that a member with his member ID "12345" selected "answer 1" to the-question with its number "1" of the questionnaire with its ID "123".

As shown in FIG. 6B, the purchase information 608b, which is summed up by each member ID, includes the dates of order entry, the ordered product numbers on respective dates, the delivery dates, the product unit prices, the numbers of the purchased products, and the total amounts obtained by multiplying the number of products by the unit prices.

For example, the purchase information 608b as shown in FIG. 6B stores the information that a member with his member ID "12345" ordered 200 units of a product with its number "0101" at the price of 15,000 yen per unit on Jan. 19, 2002, the member paid 3,000,000 yen, and the products were delivered on Jan. 22, 2002.

The service history information in the present embodiment is not limited to the above-mentioned questionnaire information 608a and the purchase information 608b, but it may include the inquiry information including the contents of the members' inquiries about the products.

FIG. 7~FIG. 9 are tables respectively showing a part of the service information 605a stored in the service information unit 605.

This service information 605a includes a keyword such as a "microwave oven" registered in the dictionary information 706a held by the analyzing server G2, relevant information such as "discount" and "campaign" in relation to the keyword "microwave oven", for instance, and services associated with the keyword and the relevant information.

The services include a plurality of texts mentioned above, contents summarizing the texts (summaries) such as "revised price (discount) information" and "inventory clearance campaign", and means (methods) for providing the texts such as "e-mail" and "partner company's page".

Here, the "partner company's page" means a members-only WWW page specific to each member company individually provided by the member service server G1, on which messages for the member and others are posted.

Also, the "text" means, if the service providing means is e-mail, a main part of the sentences inserted in the e-mail sent to the member, and if the service providing means is a partner company's page, a main part of the sentences posted on the partner company's page. This text is predicted as concrete information requested by the member so as to be handled by the service unit 602.

FIG. 7 is a table of the part showing the services associated with the keyword "microwave oven" and the relevant information "discount" in the service information 605a.

The service information 605a as shown in FIG. 7 includes the following four services by associating with the relevant information "discount" of the keyword "microwave oven": the service of providing an "e-mail" about "revised price (discount) information" with the text saying "We will revise wholesale prices of microwave ovens"; the service of providing an "e-mail" about "inventory clearance campaign" with the text saying "We will conduct inventory clearance campaign before release of new products next month"; the service of providing a "partner company's page" about "new product briefing" with the text saying "We will hold a briefing of new microwave ovens with single function to be released in 3 months"; and the service of providing a "partner company's page" about "replacement advice" with the text saying "We will offer a service of electric expenses comparison between your microwave oven and a new one".

FIG. 8 is a table of the part showing the services associated with the keyword "microwave oven" and the relevant information "campaign" in the service information 605a.

The service information 605a as shown in FIG. 8 includes the following four services by associating with the relevant information "campaign" of the keyword "microwave oven": the service of providing an "e-mail" about "advance sale of new products" with the text saying "This informs you about advance sale of new products to be released on 20th next month"; the service of providing an "e-mail" about "staff dispatch" with the text saying "We will dispatch our staff to explain a new product. Please . . . "; the service of providing a "partner company's page" about "color selection campaign" with the text saying "We will offer a new product in your favorite color"; and the service of providing a "partner company's page" about "frozen food home delivery" with the text saying "We will start a service of delivering frozen food to your house if you apply at the time of purchasing . . . ".

FIG. 9 is a table of the part showing the services associated with the keyword "induction heating cooker" and the relevant information "EF Company" in the service information 605a.

The service information 605a as shown in FIG. 9 includes the following four services by associating with the relevant information "EF Company" of the keyword "induction heating cooker": the service of providing an "e-mail" about "new product briefing" with the text saying "We will hold a briefing of new induction heating cookers to be released next month . . . "; the service of providing an "e-mail" about "staff evaluation" with the text saying "Please evaluate work behavior of our staff"; the service of providing a "partner company's page" about "questionnaire" with the text saying "We will conduct questionnaire on induction heating cookers"; and the service of providing a "partner company's page" about "information exchange meeting" with the text saying "EF Company, GH company and our company will hold an information exchange meeting on induction heating cookers".

On the other hand, the analyzing server G2 includes, as shown in FIG. 2, a predicting unit 701 that is a deriving means for predicting and deriving categories of the members' orientation area on purchase; a category information unit 705 for storing category information 705a referred to by the predicting unit 701 for the prediction; a result storing unit 702 for storing the prediction results as prediction result information 702a; a keyword extracting unit 703 for searching the dictionary information 706a for keywords belonging to the categories predicted by the predicting unit 701 based on the prediction result information 702a to extract the keywords; a keyword dictionary unit 706 for storing the dictionary information 706a; an extraction result storing unit 704 for storing the extracted keywords as extraction result information 704a; a searching unit 708 for accessing the company's own home pages to search for the keywords stored in the extraction result information 704a and extracting the descriptions including the keywords; and a search result storing unit 707 for storing the extracted descriptions as search result information 707a.

The analyzing server G2 further includes a service pattern unit 710 for holding the information except the texts in the service information 605a as pattern information 710a; navigation unit 711 for controlling mutually with the analysis instructing terminal J2 so that the service provider can accurately specify the services requested by the member from among the pattern information 710a based on the search result information 707a in the search result storing unit 707 and the pattern information 710a in the service pattern unit 710, and selecting the services in response to the instruction from the analysis instructing terminal J2; a selection result displaying unit 715 for displaying the services selected by the navigation unit 211 and the pattern information 710a on the analysis instructing terminal J2; and a selection result storing unit 709 for storing the selection result by the navigation unit 711. In the present embodiment, a service instructing means is comprised of the analysis instructing terminal J2, and a selecting means is comprised of the navigation unit 711 and the selection result displaying unit 715.

The analyzing server G2 further includes an analysis instructing unit 712 for instructing the predicting unit 701 to start predicting a category depending on the control signal from the analysis instructing terminal J2; a search result displaying unit 713 for displaying on the analysis instructing terminal J2 the contents and update situation of the search result information 707a in the search result storing unit 707; and a service selection instructing unit 714 for instructing the navigation unit 711 to select the services depending on the control signal from the analysis instructing terminal J2. In the present embodiment, a description extracting means is comprised of the searching unit 708 and the search result displaying unit 713.

The predicting unit 701 searches the category information 705a for the category based on the information such as the service history information including the questionnaire information 608a and the purchase information 608b stored in the service history unit 608 of the member service server G1, the member information 609a stored in the member information unit 609 of the member service server G1, and the log information 610a stored in the log information unit 610 of the member service server G1, and predicts the category as the member's orientation area on purchase.

In the category information 705a, the categories which are generally derived from the contents of the service history information, the member information 609a and the log information 610a, respectively, are compiled and stored by each content.

FIG. 10A is a table showing the category information 705a based on the questionnaire results.

In the category information 705a as shown in FIG. 10A, which is compiled by a questionnaire ID, the question numbers assigned to respective questions of the questionnaire, the answer numbers assigned to all the selectable answers to the questions and the categories derived from the answers with those answer numbers are stored.

For example, when judging that the answer number to the question number "2" of the questionnaire ID "123" is "1" based on the contents of the questionnaire information 608a, the predicting unit 701 searches the above-mentioned category information 705a for the category applicable to the above contents, and predicts "stock information" for the category of the member's purchase orientation.

FIG. 10B is a table showing the category information 705a derived based on the purchase history.

In the category information 705a shown in FIG. 10B, the model numbers of the products and the categories derived from the model numbers are stored.

For example, when judging that the member has purchased the product with model number "1524" based on the contents of the purchase information 608b, the predicting unit 701 searches the category information 705a for the category applicable to the above contents, and predicts a "kitchen appliance" for the category of the member's purchase orientation.

FIG. 10C is a table showing the category information 705a derived based on the questionnaire results and the members' industries.

In the category information 705a shown in FIG. 10C, which is complied by a questionnaire ID, the question numbers assigned to respective questions of the questionnaire, the answer numbers assigned to all the selectable answers to the questions, the members' industries categorized by each answer number, and the categories derived from the answers with respective answer numbers and the industries are stored.

For example, when judging that the answer number to the question number "1" of the questionnaire ID "123" is "2" and the industry is "manufacturing" based on the contents of the questionnaire information 608a and the member information 609a, the predicting unit 701 searches the category information 705a for the category applicable to the above contents, and predicts a "computer" for the category of the member's purchase orientation.

In this case, it is possible to predict the category of the member's purchase orientation much more accurately based on the attributes in the member information 609a, compared with predicting the category based on the category information 705a as shown in FIG. 10A.

FIG. 10D is a table showing the category information 705a derived based on the log information 610a.

In the category information 705a as shown in FIG. 10D, the numbers assigned to the WWW pages, the information on whether the WWW page with each number has been viewed twice or more, the information on whether the WWW page with each number has been viewed for five minutes or more, and the categories derived from these information and the numbers assigned to the WWW pages are stored.

For example, when judging based on the contents of the log information 610a that the member views the news WWW page with the number "5" twice or more a day and for five minutes or more for one view, the predicting unit 701 searches the category information 705a for the category applicable to the above contents, and predicts "stock information" for the category of the member's purchase orientation. Also, when judging that the member views that WWW page twice or more a day but for less than five minutes for one view, the predicting unit 701 predicts, based on the category information 705a, "economic information" which belongs to broader category than "stock information" for the category of the member's purchase orientation.

In this case, the predicting unit 701 can predict accurately the category of the member's purchase orientation depending on the number and time duration of the member's views of the WWW pages. In the category information 705a as shown in FIG. 10D, the threshold number of views is 2 and the threshold time duration of one view is 5 minutes, but the present invention is not limited to those values, and the threshold number of views may be 3 or more, or the threshold time duration of one view may be 6 minutes or more.

When the category information 705a as shown in FIG. 10C is used, the predicting unit 701 predicts the category of the member's purchase orientation based on the contents of the questionnaire information 608a and the member information 609a, but it may predict that category based on at least two of the member information 609a, the questionnaire information 608a, the purchase information 608b and the log information 610a.

In this case, the category information unit 705 holds the respective contents of at least two of these information used for the predicting unit 701 to predict the category, and the category information 705a including the categories generally derived from the respective contents, which allows the predicting unit 701 to predict more accurately the category of the member's purchase orientation.

The category predicted by the predicting unit 701 as mentioned above is stored in the result storing unit 702 as the prediction result information 702a.

FIG. 11 is a table showing the prediction result information 702a.

In the prediction result information 702a, the member IDs and the categories of the members' purchase orientations with those member IDs are stored.

For example, in the prediction result information 702a as shown in FIG. 11, the categories predicted by the predicting unit 701, "kitchen appliance". "cell phone", "personal computer" and "audio device" are stored by associating with the member ID "12345".

FIG. 12 is a table showing the dictionary information 706a stored in the keyword dictionary 706.

In the dictionary information 706a, one or more keywords which are specific contents belonging to each category stored in the category information 705a are stored by associating with that category.

For example, in the dictionary information 706a as shown in FIG. 12, the keyword 1 "microwave oven", the keyword 2 "rice cooker" and the keyword 3 "induction heating cooker" are stored by associating with the category "kitchen appliance".

Based on the prediction result information 702a and the dictionary information 706a, the keyword extracting unit 703 extracts the keywords belonging to the category of the member's purchase orientation, and stores the extraction results as the extraction result information 704a in the extraction result storing unit 704. At the same time, the keyword extracting unit 703 also extracts the URL of the member company's own home page from the member information 609a of the member information unit 609 to store it in the extraction result storing unit 704.

FIG. 13 is a table showing the extraction result information 704a.

In the extraction result information 704a, the member IDs, the URLs of the company's own home pages with those member IDs, and extracted one or more keywords for each member are stored.

For example, in the extraction result information 704a as shown in FIG. 13, the URL "http://www.xx.denki.com/" of the home page of the member with the member ID "12345" and the keyword 1 "microwave oven", the keywords 2 "rice cooker" and the keyword n "induction heating cooker" are stored by associating with the member ID. Here, the number of keywords stored by associating with the member ID is the total of the keywords extracted for respective categories predicted by the predicting unit 701.

The searching unit 708 accesses the company's own home page on the public site I based on URL in the extraction result information 704a, searches the home page for the keywords in the extraction result information 704a, and extracts the descriptions including the keywords.

It will be explained below with reference to FIG. 14 how the searching unit 708 operates for extracting descriptions including keywords from a company's own home page.

Figure 14:
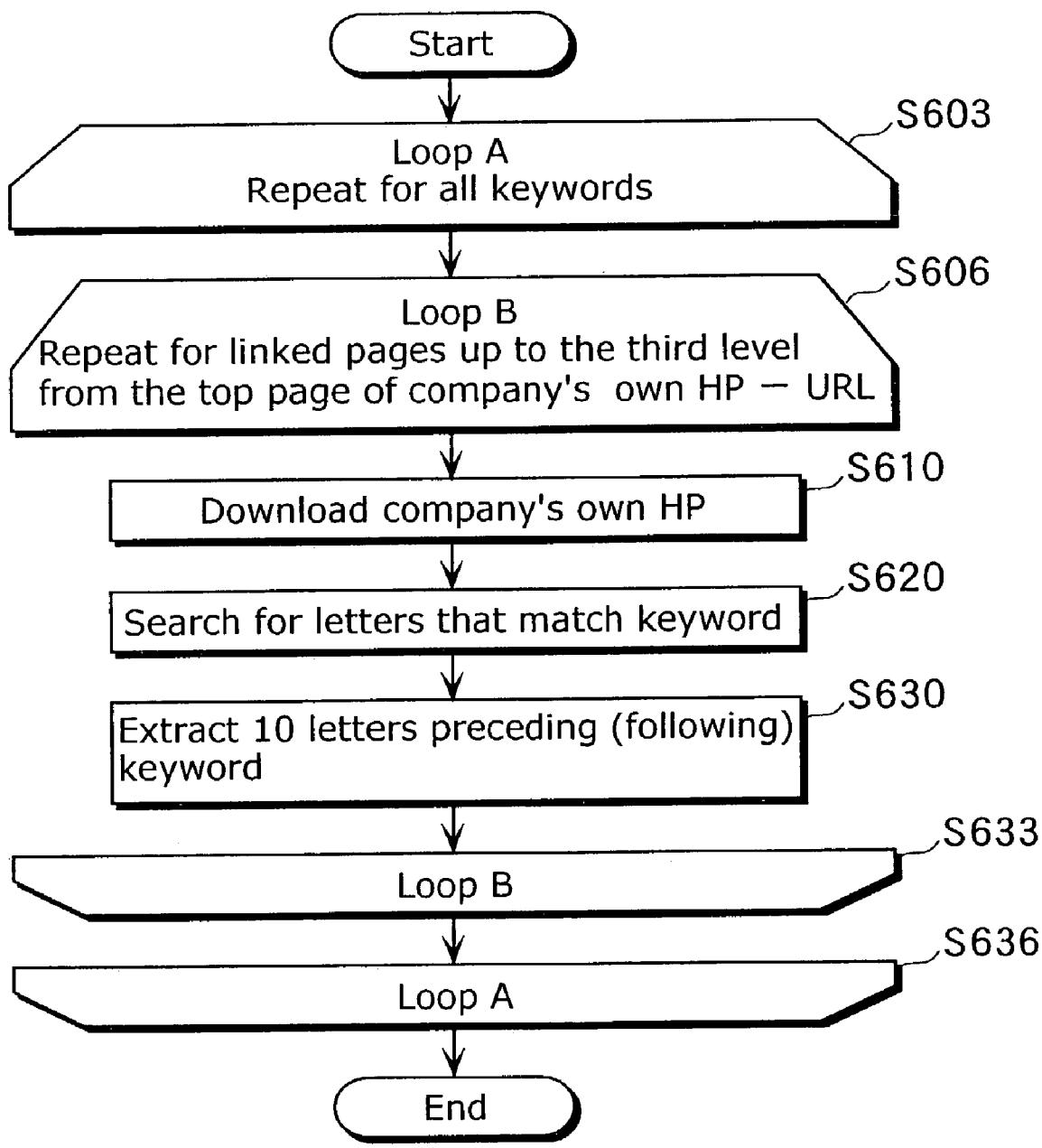
FIG. 14 is a flowchart showing operation of extracting descriptions including a keyword from a company's own home page (website) of the first embodiment.

FIG. 14 is a flowchart showing the operation of the searching unit 708.

When the extraction result information 704a in the extraction result storing unit 704 is updated, the searching unit 708 accesses the company's own home page based on a URL in the updated extraction result information 704a, repeats the operation of the following Steps S606~S633 (Loop B) for linked pages up to the third level from the top page of the home page, and then repeats the operation of Steps S603~S636 (Loop A) including the loop B for all the keywords for the members registered in the extraction result information 704a.

More specifically, the searching unit 708 first downloads the top page of the company's own home page (Step S610).

Next, the searching unit 708 searches the top page for one keyword for the member registered in the extraction result information 704a (Step S620), and if it finds the keyword, it extracts the above-mentioned descriptions including the keyword and 10 letters preceding the keyword, for instance (Step S630).

Then, the searching unit 708 repeats the operation of Steps S610~S630 for the linked pages up to the third level from the top page to extract the descriptions, and further repeats the operation of Steps S610~S630 for all the keywords for the member registered in the extraction result information 704a to extract the descriptions.

In this case, the searching unit 708 downloads the company's own home page in Step S610, but in Step S620, the searching unit 708 may search for the letters matching the keyword in the public site I where the company's home page is posted, without downloading the home page.

Also, in this case, the searching unit 708 extracts the keyword and 10 letters preceding it as descriptions, but the present invention is not limited to that. The searching unit 708 may extract the keyword and 10 letters following it as descriptions, or extract one sentence including the keyword as descriptions. The number of letters preceding or following the keyword which are to be extracted as descriptions is not limited to 10, but any number may be applied if it is one or more.

In addition, in this case, the searching unit 708 searches the linked pages up to the third level from the top page of the home page, but the present invention is not limited to that. The searching unit 708 may search the linked pages up to the first, the second or the fourth or more level.

FIG. 15 is a page display showing an example of a company's own home page.

The searching unit 708 accesses the company's own home page as shown in FIG. 15, and extracts, as the descriptions including a keyword "microwave oven", for instance, "Advance sale of new AB microwave ovens" and "microwave ovens (Product No. Z12) . . . discount".

After extracting the descriptions in this manner, the searching unit 708 stores the extraction result in the search result storing unit 707 as the search result information 707a.

FIG. 16 is a table showing the search result information 707a.

In the search result information 707a, the member IDs, the keywords which the searching unit 708 has used for the search, and the descriptions extracted from the companies' home pages are stored.

For example, in the search result information 707a as shown in FIG. 16, the member ID "12345", the keyword "microwave oven" used for searching from the company's own home page, and the descriptions extracted for the keyword, such as "Advance sale of new AB microwave ovens" and "microwave ovens (Product No. Z12) . . . discount" are stored.

Note that in the present embodiment, URLs of the home pages of the member companies registered in the member information 609a are obtained with the members' consent, and thus the descriptions are also extracted, with the member companies' consent, from their home pages using the URLs obtained in this manner.

FIG. 17 is a table showing the pattern information 710a.

In the pattern information 710a, the information other than the texts of the services in the service information 605a of the service information unit 605 is stored, as mentioned above. More specifically, all the keywords included in the dictionary information 706a of the keyword dictionary unit 706, the relevant information on respective keywords, and one or more services respectively associated with the keywords and relevant information are stored. These services include means for providing the services such as e-mails and partner company's pages, and the contents of the services for respective means. Here, the contents of the services mean the contents summarizing the texts in the service information 605a.

For example, in the pattern information 710a as shown in FIG. 17, the keyword "microwave oven"; the relevant information "discount"; and the services such as "revised price (discount) information" provided by e-mail, "inventory clearance campaign" provided by e-mail, "new product information" provided by a partner company's page, and "replacement advice" provided by a partner company's page are stored.

A flow of information processing up to the service providing for the member with the member ID "12345" registered in the member information 609a will be explained below specifically with reference to FIG. 18.

Figure 18:
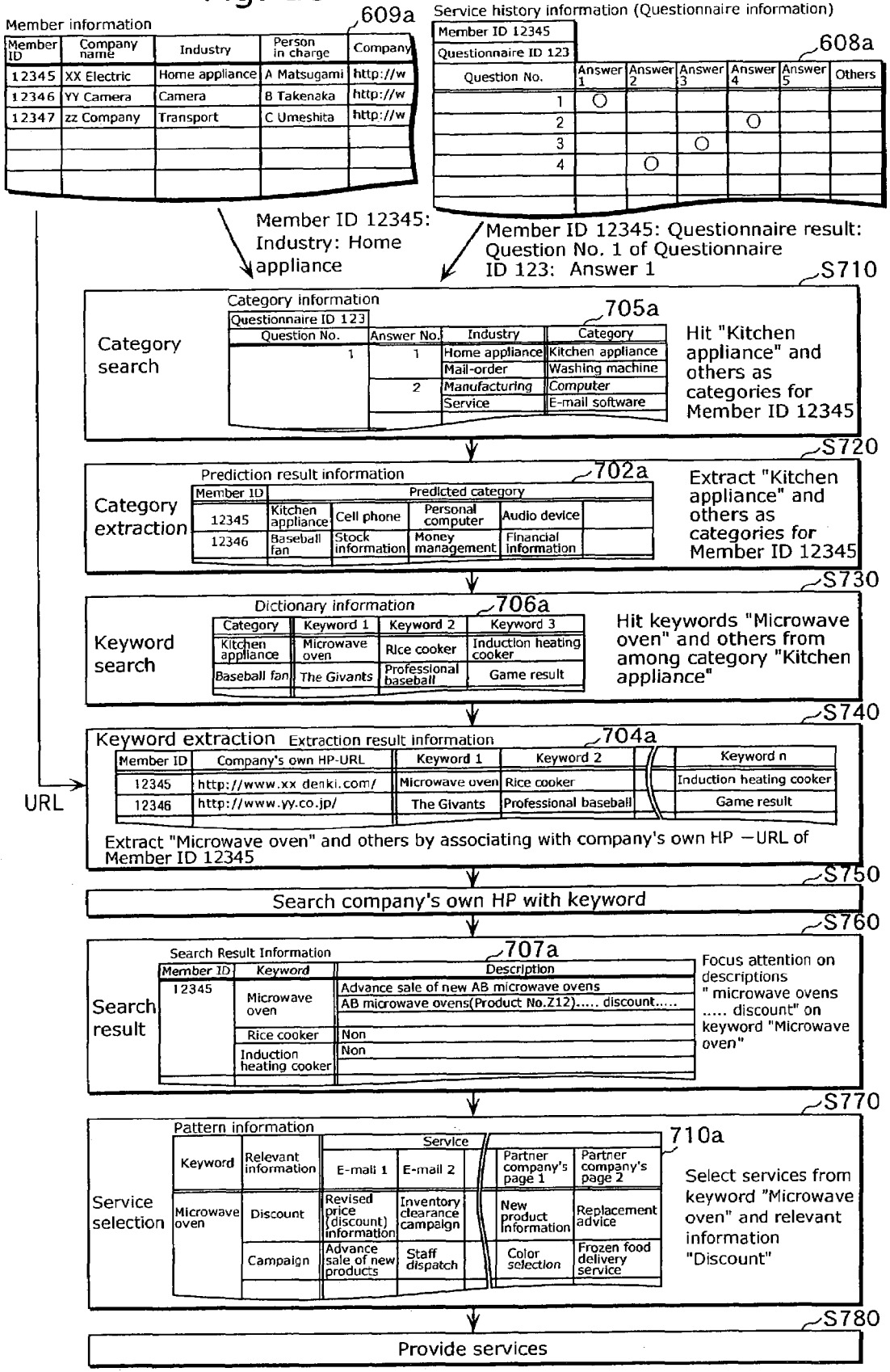
FIG. 18 is a flowchart showing an example flow of information processing in the first embodiment.

FIG. 18 is a flowchart showing an example of the information processing.

The service provider operates the analysis instructing terminal J2 to instruct the analyzing server G2 of the service providing server G to analyze the services requested by the member with the member ID "12345" based on the questionnaire information 608a. Upon receipt of the instruction via the analysis instructing unit 712, the predicting unit 701 of the analyzing server G2 starts predicting the category of the purchase orientation of the member with the member ID "12345".

The predicting unit 701 reads out the member information 609a in the member information unit 609 and the questionnaire information 608a in the service history unit 608, and as a result, obtains the information that the industry of the member with the member ID "12345" is "home appliance" and his answer to the question number "1" of the questionnaire ID "123" is "1". Then, the predicting unit 701 searches the category information 705a stored in the category information unit 705 for the category applicable to the obtained information, and predicts the category of the services requested by the member (Step S710).

In this case, since the category which corresponds to the answer number "1" to the question number "1" and the industry "home appliance" is "kitchen appliance" in the category information 705a, the predicting unit 701 predicts that the category of the member's purchase orientation is "kitchen appliance".

The predicting unit 701 also makes a prediction based on the answers to other questions of the questionnaire information 608a to predict a plurality of categories including "kitchen appliances" as those of the member's purchase orientation.

Next, after predicting a plurality of categories including "kitchen appliance" as mentioned above, the predicting unit 701 extracts these categories from the category information 705a to update the prediction result information 702a in the result storing unit 702 (Step S720). Thus, the extracted categories such as "kitchen appliance" are stored in the prediction result information 702a by associating with the member ID "12345".

When the prediction result information 702a in the result storing unit 702 is updated, the keyword extracting unit 703 searches the dictionary information 706a stored in the keyword dictionary unit 706 for the keywords corresponding to the categories associated with the member ID "12345" in the prediction result information 702a (Step S730).

For example, since the keywords corresponding to the category "kitchen appliance" are "microwave oven", "rice cooker" and "induction heating cooker", the keyword extracting unit 703 judges that these keywords "microwave oven", "rice cooker" and "induction heating cooker" correspond to the search criteria.

The keyword extracting unit 703 also makes the above-mentioned search for other categories predicted by the predicting unit 701, and judges whether keywords other than "microwave oven", "rice cooker" and "induction heating cooker" correspond to the search criteria.

Next, the keyword extracting unit 703 extracts the keywords searched as above from the dictionary information 706a, and updates the keywords associated with the member ID "12345" in the extraction result information 704a stored in the extraction result storing unit 704 into the above-mentioned extracted keywords. If the member ID "12345" is not stored in the extraction result information 704a, the keyword extracting unit 703 stores the member ID "12345" in the extraction result information 704a before extracting the URL of the member company's own home page from the member information 609a, and stores the URL and the extracted keywords such as "microwave oven" in the extraction result information 704a by associating with the member ID "12345" (Step S740).

After the extraction result information 704a is updated, the searching unit 708 accesses the company's home page located at the URL of the member ID "12345" stored in the extraction result information 704a, and searches the home page for the keywords associated with the member ID "12345" (Step S750).

At that time, the searching unit 708 extracts the keywords and the descriptions including 10 letters, for instance, preceding or following the keywords, from the company's home page.

Then, the searching unit 708 updates the keywords and the descriptions associated with the member ID "12345" in the search result information 707a stored in the search result storing unit 707 based on the search and extraction result mentioned above. If the member ID "12345" is not stored in the search result information 707a, the searching unit 708 additionally stores the member ID "12345" and the above-mentioned keywords and descriptions in the search result information 707a (Step S760).

Here, the search result by the searching unit 708, that is, the updated search result information 707a, is displayed on the analysis instructing terminal J2 via the search result displaying unit 713.

Focusing attention on the description "microwave ovens (Product No. Z12) . . . discount" corresponding to the keyword "microwave oven" associated with the member ID "12345" based on the search result information 707a displayed on the analysis instructing terminal J2, the service provider can obtain the information that the member's purchase orientation is not an "electric blender" nor an "electric grill" but a "microwave oven" among the information belonging to the category "kitchen appliance" and, more specifically, that the member does not "want to sell a microwave oven" nor "want to know the principle of microwave ovens", but he wants the information about "microwave ovens discount".

As a result, the service provider can predict accurately the services the member with the member ID "12345" is likely to want based on the information displayed on the analysis instructing terminal J2.

Then, the service provider selects the services to be provided for the member from among the pattern information 710a in the service pattern unit 710 displayed on the analysis instructing terminal J2, under the control of the navigation unit 711 (Step S770).

Specifically, if there is "discount" in the relevant information corresponding to the keyword "microwave oven" in the pattern information 710a, the service provider operates the analysis instructing terminal J2 to specify the services associated with the relevant information "discount", and instructs the navigation unit 711 to select them as services to be provided for the member.

Upon receipt of this instruction via the service instructing unit 714, the navigation unit 711 selects the services from among the services stored in the pattern information 710a based on the instruction, and stores the selection result in the selection result storing unit 709.

Then, when the service provider operates the service instructing terminal J1 to instruct the member service server G1 to start providing the services, the member service server G1 provides the selected services to the member based on the information stored in the selection result storing unit 709 (Step S780).

The selection of the services in above-mentioned Step S770 will be explained below in detail.

For selecting the services, the navigation unit 711 displays a "service selection menu" screen for accepting the instruction from the analysis instructing terminal J2 on the analysis instructing terminal J2 via the selection result displaying unit 715 and the search result displaying unit 713.

Figure 19:
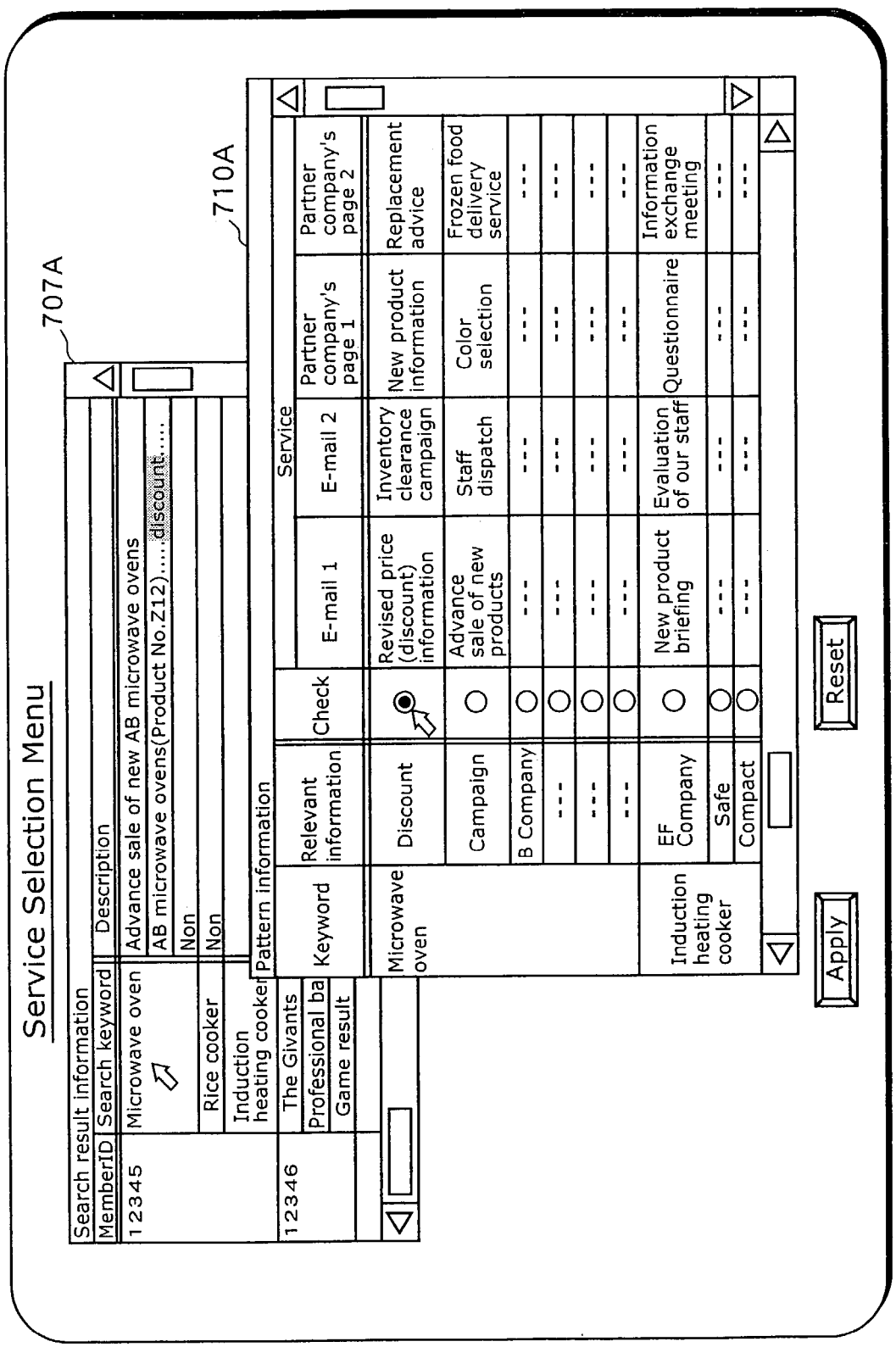
FIG. 19 is a screen display showing a service selection menu screen of the first embodiment.

FIG. 19 is the "service selection menu" screen displayed on the analysis instructing terminal J2.

On the "service selection menu" screen, a search result information screen 707A showing the above-mentioned search result information 707a and a pattern information screen 710A showing the pattern information 710a are displayed.

Since the checkboxes for marking every relevant information are displayed on the pattern information screen 710A, the service provider marks a checkbox with reference to the search result information screen 707A so as to specify the services corresponding to the marked relevant information. Specifically, the service provider marks the checkbox by clicking a mouse at the box pointed to by the arrow.

FIG. 20 is a flowchart showing the operation of the navigation unit 711 for displaying the "service selection menu" to select the services for the members.

First, the navigation unit 711 searches for the relevant information corresponding to the keywords stored in the pattern information 710a from among the descriptions on the search result information screen 707A, and if there is the corresponding relevant information, the navigation unit 711 highlights or shades it so as to distinguish it from other information in a different display manner (Step S810).

For example, since there is the relevant information corresponding to the keyword "microwave oven" such as "discount", and "campaign" and others in the pattern information 710a, the navigation unit 711 searches the descriptions corresponding to the keyword "microwave oven" on the search result information screen 707A for the above-mentioned relevant information, and shades "discount" corresponding to the search result to display the relevant information thereof, as shown in FIG. 19.

As a result, since the relevant information stored in the pattern information 710a is displayed in the shaded manner on the search result information screen 707A, the service provider can easily find the relevant information stored in the pattern information 710a on the search result information screen 707A. Specifically, when finding the shaded relevant information "discount" in the descriptions corresponding to the keyword "microwave oven" displayed on the search result information screen 707A, the service provider can easily judge that the services corresponding to "discount" are stored in the pattern information 710a.

Further, when the service provider operates the analysis instructing terminal J2 to point to the keyword by an arrow to select it on the search result information screen 707A, the navigation unit 711 acquires the selected keyword (Step S820) and displays the selected keyword and the relevant information and services corresponding to the keyword in a scrolling manner on the pattern information screen 710A (Step S830).

For example, when the service provider points to the keyword "microwave oven" on the search result information screen 707A for selection, the navigation unit 711 acquires the selected keyword "microwave oven" and displays, on the pattern information screen 710A, the keyword "microwave oven", the relevant information "discount" corresponding to that keyword, and the services, such as "revised price (discount) information" and "inventory clearance campaign", associated with these relevant information.

The navigation unit 711 can easily display, on the pattern information screen 710A, the services related to the search result information 707a from among the services stored in the pattern information 710a.

Here, for specifying the services corresponding to the relevant information "discount" of the keyword "microwave oven", the service provider marks the checkbox corresponding to the relevant information "discount". Then, the navigation unit 711 temporarily memorizes the marking on the checkbox to continue to display the marking (Step S840).

If the service provider specifies the services corresponding to other relevant information (No in Step S850), the navigation unit 711 repeats the above-mentioned operation of Steps S820~S840 according to the operation of the analysis instructing terminal J2 by the service provider.

When the service provider completes marking the checkboxes corresponding to the relevant information of all the services to be specified and selects a button "Apply" at the foot of the "service selection menu" screen, the analysis instructing terminal J2 outputs a control signal for instructing the analyzing server G2 to select the services corresponding to all the relevant information marked on the checkboxes (Yes in Step S850).

As a result, upon receipt of the control signal outputted from the analysis instructing terminal J2 based on the above-mentioned operation via the service selection instructing unit 714, the navigation unit 711 selects, based on the control signal, the services to be provided for the member, that is, the services such as "revised price (discount) information" and "inventory clearance campaign" by e-mails and "new product information" and "replacement advise" by partner company's pages which correspond to the relevant information "discount" of the keyword "microwave oven" marked on the checkbox, and stores them as the selection result information 709a (See FIG. 21) in the selection result storing unit 709 (Step S860).

If the checkboxes corresponding to the relevant information other than the information "discount" are marked, the services associated with the other relevant information are also stored in the selection result information 709a in the selection result storing unit 709.

FIG. 21 is a table showing the selection result information 709a.

The selection result information 709a includes the member ID of the member, the services selected for the member, the keywords and the relevant information.

For example, as shown in FIG. 21, the selection result information 709a includes, for the member with the member ID "12345", the services of "revised price (discount) information" and "inventory clearance campaign" by e-mails and the services of "new product information" and "replacement advise" by partner company's pages which correspond to the relevant information "discount" to the keyword "microwave oven". The selection result information 709a further includes the services of "new product briefing" and "evaluation of out staff" by e-mails and the services of "questionnaire" and "information exchange" by partner company's pages which correspond to the relevant information "EF Company" to the keyword "induction heating cooker".

A "Reset" button is displayed at the foot of the "service selection menu" screen. If the "Reset" button is selected before the "Apply" button is selected after the checkbox is marked, all the marks are cancelled.

For starting providing the services in Step S780 as shown in FIG. 18, the service provider operates the service instructing terminal J1 to display, on the service instructing terminal J1, a "service details setting" screen for selecting the details of some of the services selected on the "service selection menu".

More specifically, when the service provider enters a member ID of a member for providing services on the service instructing terminal J1, the service instructing terminal J1 outputs a control signal corresponding to the entry data. Upon receipt of the control signal via the service instructing unit 607, the editing unit 606 reads out the selection result information 709a corresponding to the member stored in the selection result storing unit 709, that is, the services selected for the member on the "service selection menu". The editing unit 606 notifies the service instructing terminal J1 of the read-out selection result information 709a, and the service instructing terminal J1, upon receipt of the notification, displays the services on the "service details setting" screen. The editing unit 606 further extracts the texts corresponding to the services stored in the selection result information 709a from the service information 605a in the service information unit 605, and notifies the service instructing terminal J1 of the extracted texts. As a result, on the "service details setting screen", the services selected for the member on the "service selection menu" and the texts corresponding to the services are displayed.

FIG. 22 is the "service details setting" screen displayed on the service instructing terminal J1.

On the "service details setting" screen, the member ID of the member to whom the services are to be provided, a service screen 800A and a service text display screen 860A are displayed. The name and attributes of the member may be displayed on the "service details setting" screen, in addition to the member ID. In this case, the editing unit 606 acquires the attributes of the member from the member information 609a in the member information unit 609 and displays them on the service instructing terminal J1.

Here, on the service screen 800A, the means and types of all the services selected for the member from the "service selection menu", the checkboxes similar to those mentioned above which are respectively associated with the services, and the keywords and relevant information are displayed.

More specifically, when the service provider marks the checkboxes corresponding to the means and types of the services to be provided for the member on the "service details setting" screen to select the "OK" button at the foot of the screen, a control signal based on the marking is outputted from the service instructing terminal J1. Upon receipt of the control signal via the service instructing unit 607, the editing unit 606 further selects only the services corresponding to this marking to deem them as the services for the member, and stores the decision in the service information unit 605 temporarily.

For example, the editing unit 606 selects, as the services for the member, only "revised price (discount) information" by e-mail and "new product information" by partner company's page which are marked on the "service details setting" screen, from among four services associated with the relevant information "discount" of the keyword "microwave oven" marked on the "service selection menu", that is, "revised price (discount) information" and "inventory clearance campaign" by e-mails and "new product information" and "replacement advise" by partner company's pages.

On the other hand, on the service text display screen 860A, the text of each service displayed on the service screen 800A is displayed. For example, in association with the service of "revised price (discount) information" by "e-mail" for the relevant information "discount" of the keyword "microwave oven" displayed on the service screen 800A, the text "We will revise (discount) the wholesale prices of our microwave ovens . . . " is displayed on the service text display screen 860A.

Thus, when marking the checkbox on the service screen 800A as mentioned above, the service provider can easily grasp the text of the service corresponding to that marking.

Here, the service provider can modify the text on the service text display screen 860A before selecting the "OK" button.

More specifically, the editing unit 606 edits the text depending on the control signal outputted from the service instructing terminal J1 according to the entry of the service provider, creates, based on the editing result, the editing result information 605b associated with the member with the member ID displayed on the "service details setting" screen, and stores the editing result information 605b in the service information unit 605. When editing the text, the editing unit 606 determines whether or not the editing result information 605b associated with the member has been already stored in the service information unit 605. If it is not stored, the editing unit 606 creates the editing result information 605b associated with the member, and if it is stored, the editing unit 606 updates the editing result information 605b based on the editing result.

FIG. 23 is a table showing the editing result information 605b.

In the editing result information 605b, the member ID, the services selected on the "service details setting" screen from among the services for the member with the member ID included in the selection result information 709a, and the edited texts for the services if the texts are edited on the "service details setting" screen, are stored.

For example, the editing result information 605b as shown in FIG. 23 includes the member ID "12345"; the services of "revised price (discount) information" by "e-mail" and "new product information" by "partner company's page" corresponding to the relevant information "discount" of the keyword "microwave oven"; the edited texts for the services of "We will revise (discount) the wholesale prices of our microwave ovens . . . " and "We will hold a briefing of new microwave ovens . . . in 3 month . . . "; and the service of "questionnaire" by "partner company's page" associated with the relevant information "EF Company" of the keyword "induction heating cooker". Since the text corresponding to the service of "questionnaire" is not edited on the "service details setting" screen, the information of "No change" is stored for the service of "questionnaire" in the editing result information 605b. The text corresponding to the service of "questionnaire" stored in the service information 605a is used for that service.

The texts in the service information 605a are not only read out for providing the services for the members, but may be read out and edited at any time by the editing unit 606 under the operation of the service instructing terminal J1, and stored in the service information unit 605 as the editing result information 605b. As mentioned above, since the editing unit 606 edits the texts of the service information 605a, the information which can be provided to the members is updated whenever necessary and made to be specific to each member.

Next, the editing unit 606 notifies the service instructing terminal J1 of the services selected and decided as mentioned above, and displays them as "service selection result" on the service instructing terminal J1.

FIG. 24 shows the "service selection result" screen.

On the "service selection result" screen, the member ID of the member to whom the services are to be provided and the service list screen 810A are displayed. On the service list screen 810A, the means, types and texts of the decided services, the keywords and the relevant information are displayed. On the "service selection result" screen, the attributes of the member with the member ID such as his name and sex may be displayed in addition to the member ID. In this case, the editing unit 606 acquires the attributes of the member from the member information 609a in the member information unit 609 and displays them on the service instructing terminal J1.

In addition, the texts displayed on the service list screen 810A are stored in the editing result information 605b. Specifically, on the service list screen 810A, only the texts edited on the "service details setting" screen are displayed from among the texts for the services, and the unedited texts are not displayed but the information "no change" is displayed. The edited texts are displayed with the edited portions underlined for highlighting them, for instance.

This "service selection result" screen allows the service provider to check what kinds of services were selected for the member and how the texts for the services were edited. For example, the "service selection result" screen as shown in FIG. 24 allows the service provider to confirm that "revised price (discount) information" by e-mail and "new product information" by partner company's page on a microwave oven and "questionnaire" by partner company's page on an induction heating cooker are selected for the member with the member ID "12345". It also allows the service provider to confirm that the text for the service of "revised price (discount) information" on a microwave oven by e-mail has been edited and the edited portions are "X54321, Y64321".

When the service provider confirms the selected services on the "service selection result" screen and selects the "Decide Service" button at the foot of this screen, the service instructing terminal J1 instructs the member service server G1 to provide the services displayed on the service list screen 810A to the member with the member ID displayed on the "service selection result" screen.

Next, upon receipt of the instruction from the service instructing terminal J1 by the selection of the "Decide Service" button, the service instructing unit 607 of the member service server G1 notifies the service unit 602 of the instruction via the editing unit 606 and the service information unit 605. Upon receipt of the notification, the service unit 602 reads out the services stored in the editing result information 605b and the member ID because that editing result information 605b which is determined for the member on the "service details setting" screen is stored in the service information unit 605.

When the texts are stored in the services in the editing result information 605b, the service unit 602 extracts the texts, while when they are not stored (the information "no change" is stored), it reads out the service information 605a stored in the service information unit 605 to extract the texts corresponding to the services in the editing result information 605b. Then, the service unit 602 sends e-mails with the extracted texts or posts the extracted texts on the partner company's page for the member, thereby providing the services for the member.

For example, if the editing result information 605b as shown in FIG. 23 is stored in the service information unit 605, the service unit 602 extracts the text "Product number: X54321, Y64321" as a text for the service of "revised price (discount) information" by e-mail for the relevant information "discount" of the keyword "microwave oven", and extracts the text "When: 15th or 17th of next month" as a text for the service of "new product information" by partner company's page for the relevant information "discount" of the keyword "microwave oven". Also, in order to extract the text for the service of "questionnaire" by partner company's page for the relevant information "EF Company" of the keyword "induction heating cooker", the service unit 602 does not extract it from the editing result information 605b but reads out the service information 605a from the service information unit 605 because that text is not stored in the editing result information 605b, and then extracts the text of the service information 605a corresponding to that service. If the service information 605a as shown in FIG. 9 is stored in the service information unit 605, for instance, the service unit 602 extracts the text corresponding to the service, "We will conduct questionnaire on induction heating cookers . . . ."

Figure 25:
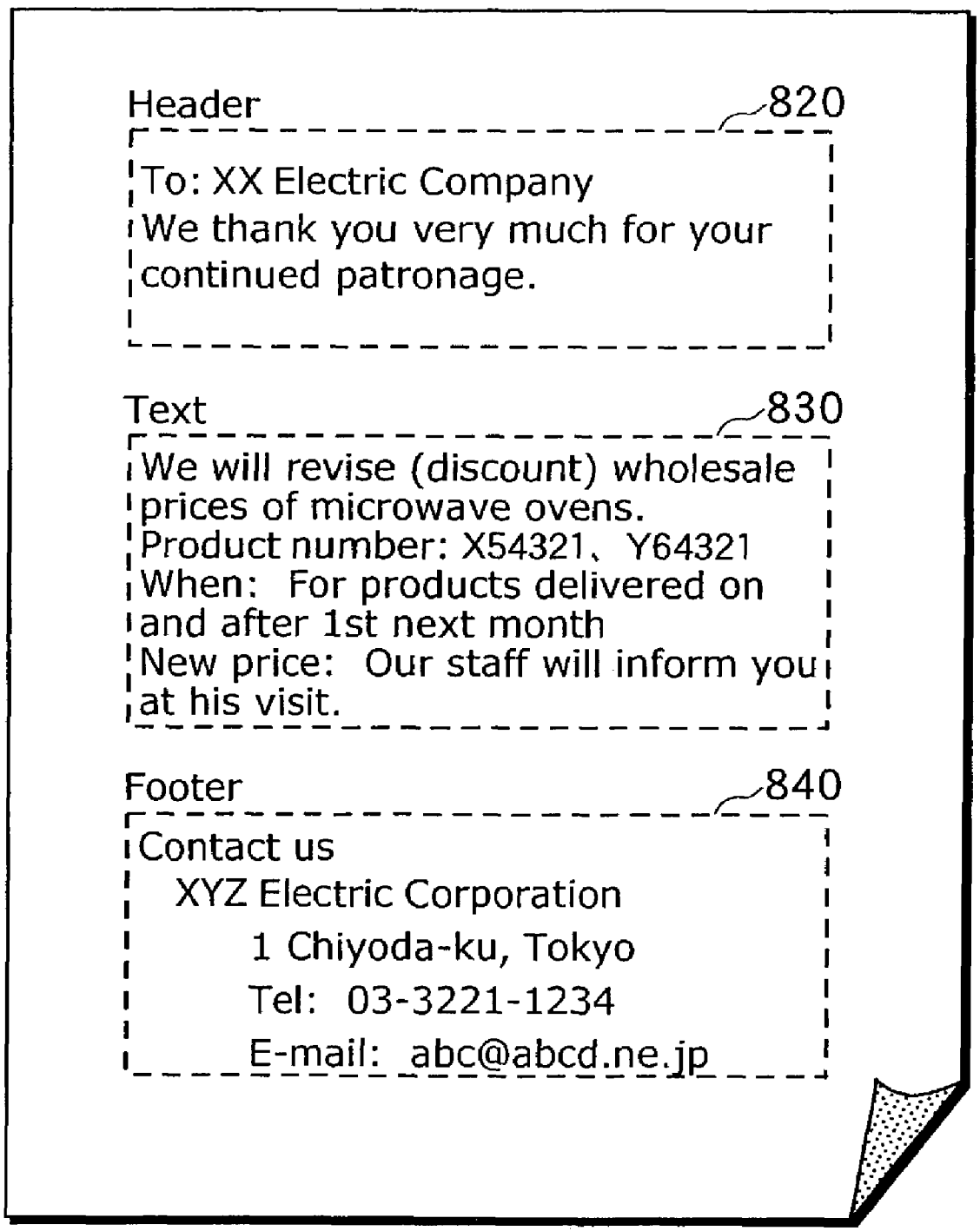
FIG. 25 is a diagram for explaining sentences inserted in an e-mail in the first embodiment.

FIG. 25 is a diagram for explaining an example of sentences inserted in an e-mail.

As shown in FIG. 25, the service unit 602 creates the sentences including a header 820, a text 830 and a footer 840, inserted in an e-mail, and sends the e-mail.

Here, the sentence "We thank you very much for your continued patronage", except a company's name, in the header 820, is common to the e-mails to all the members and for all the services, and is pre-stored in the service unit 602. In response to the above-mentioned notification from the service instructing unit 607, the service unit 602 creates the header 820 by combining the company's name and this pre-stored sentence.

Similarly, the footer is common to the e-mails to all the members and for all the services, and is pre-stored in the service unit 602 as "Contact us", for instance.

More specifically, the service unit 602 places the text extracted from the editing result information 605b between the header 820 and the footer 840 to create the sentences to be inserted in the e-mail. If the text for the above-mentioned service is not stored in the editing result information 605b, the service unit 602 extracts the text corresponding to that service from the service information 605a and places it between the header 820 and the footer 840 to create the text to be inserted in the e-mail.

Note that the sentences and the format as shown in FIG. 25 are just examples, and the present invention is not limited to those.

When the service unit 602 extracts, from the service information 605a, the text "We will conduct questionnaire on induction heating cookers . . . " for the service of "questionnaire" by a partner company's page for the relevant information "EF Company" of the keyword "induction heating cooker", as described above, it inserts the text extracted from the service information 605a into the questionnaire page and displays a button linked to that page on the partner company's page for the member.

FIG. 26 is a screen display showing a questionnaire page.

On this screen, the questionnaire 850 including question boxes into which the texts extracted as above are inserted is displayed. Five answers, for instance, are prepared for each question, and a checkbox is provided for each answer in the same manner as mentioned above.

When the member marks the checkbox using the member terminal H to answer each question of the questionnaire 850 and selects the "OK" button at the foot of the screen, the answers are stored in the questionnaire information 608a in the service history unit 608.

As described above, in the present embodiment, since the predicting unit 701 predicts the category of the member's purchase orientation based on the information specific to the member such as the questionnaire information 608a and the log information 610a, and thus the descriptions belonging to the category are extracted from the company's own home page and displayed on the analysis instructing terminal J2, the service provider can accurately predict the services the member is most likely to want based on the descriptions. As a result, unnecessary information service for the member companies can be prevented, and thus the communication load and power consumption can be reduced.

Note that the descriptions are extracted from the company's own home page using the URL registered in the member information 609a with the member's consent.

Also, when extracting the descriptions belonging to the category from the company's own home page, the analyzing server G2 searches the home page for the specific keywords belonging to the category, and extracts the descriptions including the keywords as the descriptions belonging to the category of the member's purchase orientation. Therefore, the analyzing server G2 can extract the descriptions belonging to the category from the company's own home page accurately and without omission.

In the present embodiment, since the service unit 602 of the service providing server G selects the texts to be provided to the member from among a plurality of texts pre-stored in the service information 605a for sending by e-mail or the like, the service provider can provide the services it predicts to the member easily without creating the sentences for the e-mail based on those services. Also, in the present embodiment, since the editing unit 606 edits the texts pre-stored in the service information 605a to create the sentences to be sent to the member by e-mail or the like, the service provider can provide the member-specific services easily without creating the member-specific sentences from scratch. In addition, as shown in FIG. 25, since the sentences inserted in each e-mail include the header 820 (except the member's name) and the footer 840 which are common to all the e-mails and the text 830, the service provider can send the appropriate sentences to the member, and further, the amount of the service information 605a can be reduced because the text in the service information 605a does not need to include the contents of the header 820 and the footer 840.

By displaying the summaries of the texts of the service information 605a and the editing result information 605b on the service instructing terminal J1 and the analysis instructing terminal J2, the service provider can easily be informed about what kinds of texts are stored in the service information 605a and the editing result information 605b, or what kinds of texts are to be provided to the members. Further, since the service provider specifies any of these contents displayed on the service instructing terminal J1 or the analysis instructing terminal J2 so as to select the texts in the service information 605a or the editing result information 605b which respectively correspond to the specified contents, the service provider can provide the services more easily.

As for specifying the services on the analysis instructing terminal J2, since the search result information screen 707A and the pattern information screen 710A are displayed on the analysis instructing terminal J2, the service provider can easily specify the services to be provided to the members based on the search result information 707a.

In addition, according to the present embodiment, the means for providing the services such as e-mail and partner company's page are included in the pattern information 710a and the service information 605a and the editing result information 605b in association with the texts and types of the services, so as to make the service instructing terminal J1 and the analysis instructing terminal J2 function as a providing method selecting means. Therefore, by operating the service instructing terminal J1 and the analysis instructing terminal J2, the means for providing the texts stored in the service information 605a or the editing result information 605b to the members can be selected, which allows improvement of usability.

The service providing device according to the present invention has been explained using the first embodiment, but the present invention is not limited to this embodiment.

For example, in the present embodiment, the analyzing server G2 starts analyzing the questionnaire information 608a and the log information 610a in response to the instruction from the analysis instructing terminal J2. However, the analyzing server G2 may perform batch processing of analyzing every week or every three months, for instance, so as to update the search result information 707a in the search result storing unit 707 at every batch processing. Also, the analyzing server G2 may perform real-time processing of detecting the update of the questionnaire information 608a and the log information 610a so as to start analyzing at every update.

In the present embodiment, the service provider predicts to specify the services requested by the members based on the analysis results of the analyzing server G2, that is, the search result information 707a, but the navigation unit 711 may predict and specify the services.

More specifically, when searching to find the relevant information stored in the pattern information 710a based on the descriptions of the search result information 707a, the navigation unit 711 predicts that the services stored in the pattern information 710a, by associating with the relevant information are those requested by the members, and specifies and selects them.

Therefore, the service provider can save the processing of predicting and specifying the services.

In the present embodiment, only keywords and descriptions are stored in the search result information 707a, but URLs of companies' own home pages including these descriptions may be stored. In this case, the navigation unit 711 displays the descriptions and the URLs including them on the search result information screen 707A of the analysis instructing terminal J2.

Accordingly, the service provider can access the companies' own home pages based on the URLs displayed on the search result information screen 707A so as to check the descriptions displayed on the search result information screen 707A.

Furthermore, the present embodiment has been explained on the assumption that it is an EC site, but it may be a community site.

In the present embodiment, the service providing server G includes the member service server G1 and the analyzing server G2, but the service providing server G may be one server itself.

In addition, in the present embodiment, as means for providing services, e-mails and partner companies' pages are used, but the present invention is not limited to those means. Letters, cards, data memory mediums such as CD-ROM, and brochures may be sent to the members. Therefore, choices of means are broadened and thus usability can be further improved.

Moreover, in the present embodiment, the service unit 602 provides the information sentences to the members, but the present invention is not limited to those, and it may provide the audio and video information to the members. In this case, the audio and video data is pre-stored in the service information 605a. Therefore, audio and visual services can be provided to the members.

Second Embodiment

The service providing device according to the second embodiment of the present invention will be explained below with reference to the figures. It is noted that the operation of the service providing device can be implemented by the service providing device executing a computer program comprising program code associated with a service providing method.

Figure 27:
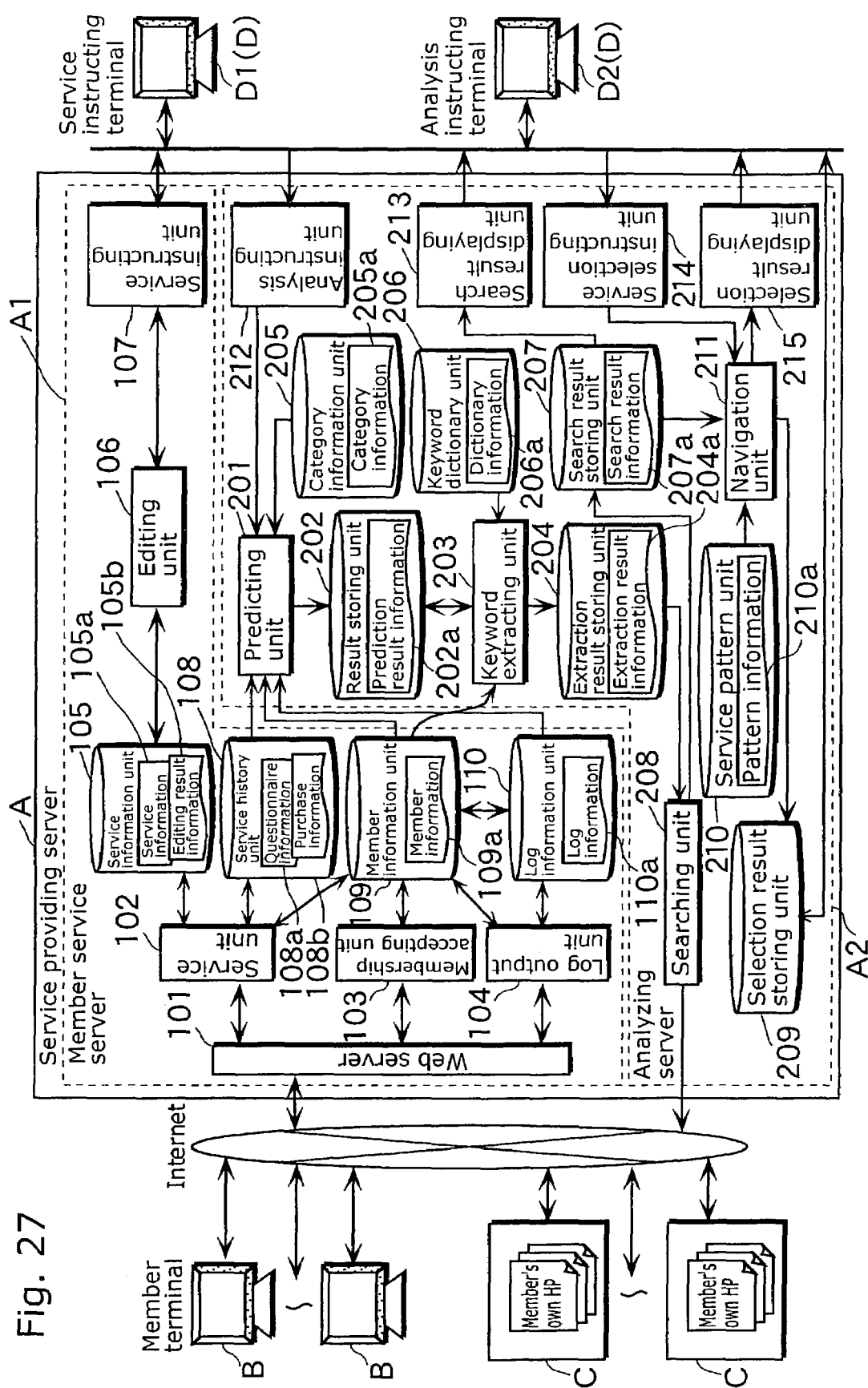
FIG. 27 is a block diagram showing a functional structure of a second embodiment of the present invention.

FIG. 27 is a block diagram showing the functional structure of the service providing device according to the second embodiment of the present invention.

This service providing device, which is a device capable of predicting accurately services which registered member customers as individual persons are most likely to want so as to provide them with great satisfaction as members, includes a service providing server A and an instructing terminal device D. The service providing server A is connected via the Internet to terminal devices B such as personal computers for performing desired information processing under the user operation and holds information specific to the members for providing services such as sales advertisements of products, and the instructing terminal device D gives desired instructions to the service providing server A under the operation of the service provider. The service providing server A is also connected to public sites C for making respective members' own home pages (websites) public via the Internet.

Here, the information specific to the members includes member information (personal information) 109a which is obtained at the membership registration, such as their identification information, the URLs (Uniform Resource Locator) indicating their own home pages, their names, sex and addresses; log information 110a on which the logs of the WWW pages accessed by the members are recorded; and service history information such as questionnaire results.

The service providing server A includes a member service server A1 and an analyzing server A2. The service providing server A holds the information specific to the members and provides services via e-mail and the like, and the analyzing server A2 holds dictionary information 206a storing one or more keywords belonging to one or more categories and analyzes the information specific to the members using the dictionary information 206a. The instructing terminal device D includes a service instructing terminal D1 which instructs the start of providing services and an analysis instructing terminal D2 which instructs the analyzing server A2 to analyze the information specific to the members for predicting the services the members are likely to want.

The overall operation of this service providing device will be explained with reference to FIG. 28.

Figure 28:
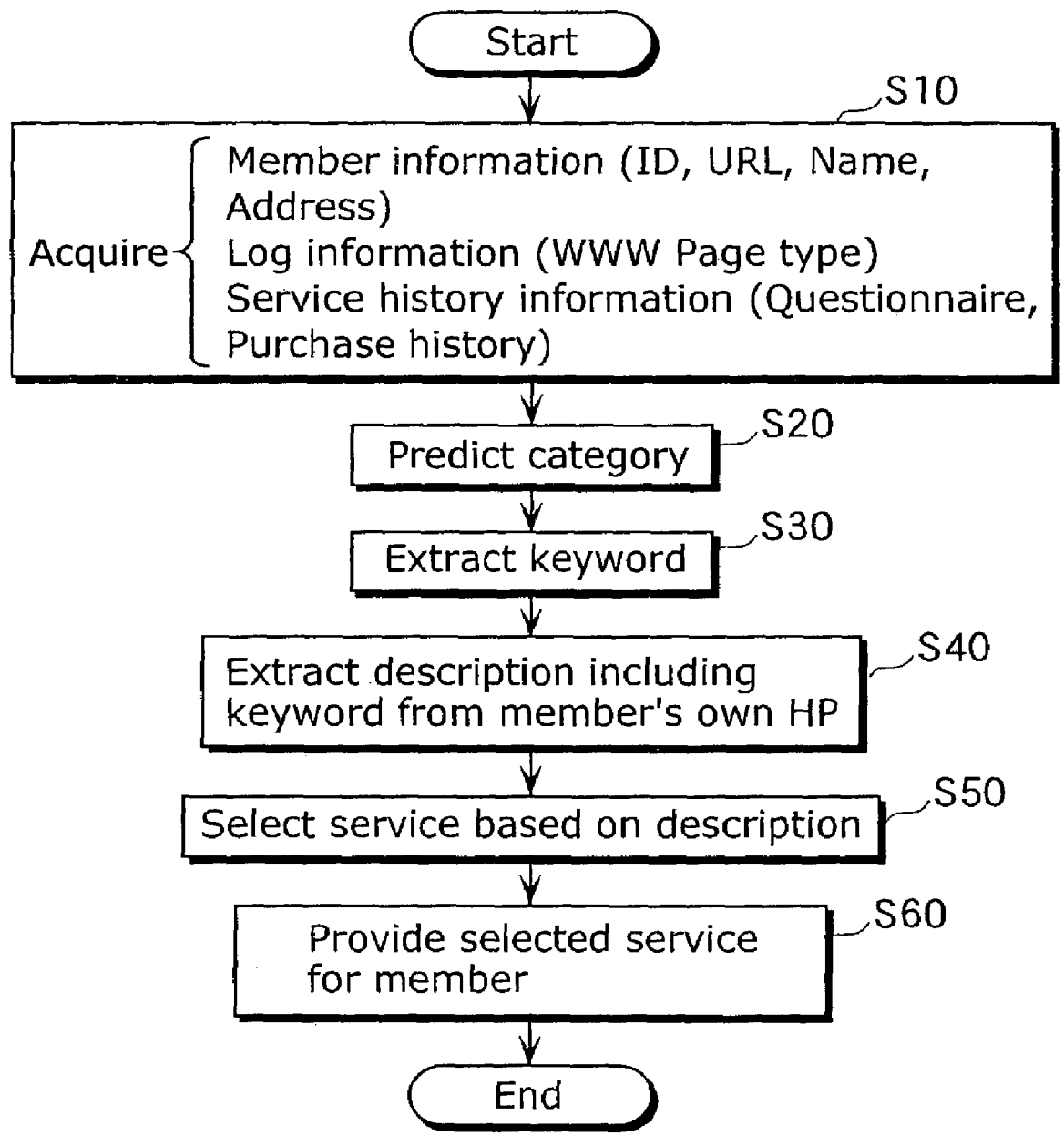
FIG. 28 is a flowchart showing overall operation in the second embodiment.

FIG. 28 is a flowchart showing the overall operation in the present embodiment.

First, when the service provider operates the analysis instructing terminal D2 to analyze the information specific to a member such as the member information 109a, the log information 110a and the service history information, the analyzing server A2 acquires the information specific to the member from the member service server A1 based on the instruction from the analysis instructing terminal D2 (Step S10), and predicts a category of the member's interest area based on the acquired information (Step S20).

Next, the analyzing server A2 searches the dictionary information 206a for keywords corresponding to the predicted category and extracts them (Step S30). Then, the analyzing server A2 accesses the member's own home page based on the URL included in the member information 109a, searches the member's own home page for the extracted keywords, and extracts the descriptions including the keywords from the home page as descriptions relating to the member's interest area (interest area descriptions) (Step S40).

Here, the service provider displays the extracted descriptions on the analysis instructing terminal D2 functioning as a display means, predicts the services the member is likely to want, and operates the analysis instructing terminal D2 so as to make the analyzing server A2 to select the services (Step S50).

Then, the service instructing terminal D1 has the analyzing server A2 notify the member service server A1 of the selection result based on the operation of the service provider, and upon receipt of the notification, the member service server A1 provides the member with the selected services (Step S60).

In the present embodiment, the URL of the member's own home page included in the member information 109a is obtained with the member's consent. In the present embodiment, before obtaining the URL, the intended use of the URL is told to the member without fail, saying, for example, that "The URL you are to enter will be used for accurately predicting the services you want based on the descriptions on your own home page and providing the services for you with great satisfaction. If you consent to this use of the URL, please enter the URL." Only with the consent of the member to the intended use of the URL, the descriptions on his home page are extracted.

The service providing server A structured as above will be explained below in detail.

As shown in FIG. 27, the member service server A1 includes a Web server 101 for managing input and output of communication signals via the Internet; a membership accepting unit 103 for encouraging the users who access from the terminal devices B via the Web server 101 to register their membership and accepts the registration; a member information unit 109 for storing the member information collected by the membership accepting unit 103 as the above-mentioned member information 109a; a service unit 102 for providing the services for the members, such as sales of products, acceptance of repairs, information service by e-mail or the like, and questionnaire requests, via the Web server 101; a service history unit 108 for storing the service histories supplied from the service unit 102 as the above-mentioned service history information; a log output unit 104 for extracting the logs of the WWW pages of the members who have accessed and outputs them; and a log information unit 110 for storing the logs outputted from the log output unit 104 as the log information 110a. The service unit 102, the membership accepting unit 103, the log output unit 104, the service history unit 108, the member information unit 109 and the log information unit 110 make up an information holding means.

The member service server A1 further includes a service instructing unit 107 for communicating with the service instructing terminal D1 for controlling the service unit 102 and an after-mentioned editing unit 106 depending upon the output from the service instructing terminal D1; a service information unit 105 holding service information 105a storing a plurality of registered sentences (hereinafter referred to as "texts") which can be supplied from the service unit 102 and are to be inserted in the above-mentioned e-mails or the like and editing result information 105b that is the modified service information 105a; and the editing unit 106 for editing the texts stored in the service information 105a based on the control signals outputted from the service instructing terminal D1 via the service instructing unit 107 so as to create or update the above-mentioned editing result information 105b.

FIG. 29 is a table showing the above-mentioned member information 109a.

The member information 109a includes member IDs, that is, identification information of respective members, attributes of the members such as their names, addresses, sex, age, occupations and birth dates, passwords specific to the members, and URLs indicating the locations of their own home pages. Note that in the present embodiment, the URLs included in the member information 109a are obtained with the consent of the members.

In the present embodiment, above-mentioned information such as the names and addresses of the members are included in the member information 109a, but the present invention is not limited to those items, hobbies, special skills and blood types, for instance, may be included.

FIG. 30A is a table showing the log information 110a storing the numbers of views of WWW pages summed up.

The log information 110a, which is summed up by each member, that is, each member ID, based on the output from the log output unit 104, includes the dates, the types of the WWW pages viewed on every date, the numbers associated with the types and the numbers of views of the WWW pages on that date.

The log information 110a as shown in FIG. 30A includes the numbers of views of the WWW pages which are summed up by each date, but may include the dates and times of the WWW page views and the time durations thereof.

FIG. 30B is a table showing the log information 110a which includes the time durations of viewing the WWW pages.

This log information 110a is summed up by each member ID, as is the case of the log information 110a shown in FIG. 30A. The log information 110a includes the dates and times, the types of the WWW pages viewed on every date, the numbers associated with the types and the time durations of viewing the WWW pages on that date.

The numbers of views accumulated on a daily basis are stored in the log information as shown in FIG. 30A of the present embodiment, but the present invention is not limited to that, and the numbers accumulated on an hourly basis or a weekly basis may be stored. Similarly, the viewing time durations are stored in minutes in the log information as shown in FIG. 30B, but the present invention is not limited to that, and they may be stored in seconds. Both the numbers of views and the viewing time durations may be stored.

FIGS. 31A and 31B are tables showing the service history information.

The service history information includes questionnaire information 108a storing the answers to the questionnaires for the members sent by the service unit 102, and purchase information 108b storing the histories of the members' accesses to the service unit 102 to purchase the products. These questionnaire information 108a and purchase information 108b are created by the service unit 102 and updated at every questionnaire or purchase of the product.

As shown in FIG. 31A, this questionnaire information 108a, which is summed up by each member ID of the member who answered the questionnaire and by each questionnaire ID for identifying each questionnaire, includes the question numbers assigned to respective questions of the questionnaire and the answers to the corresponding questions with the numbers.

For example, the questionnaire information 108a shown in FIG. 31A stores the information that a member with his member ID "123456" selected "answer 1" to the question with its number "1" of the questionnaire with its ID "123".

As shown in FIG. 31B, the purchase information 108b, which is summed up by each member ID, includes the dates, the model numbers of the products purchased on respective dates, the product prices, the numbers of the purchased products, the methods of payment, and the accumulated points given to the product purchases.

For example, the purchase information 108b as shown in FIG. 31B stores the information that a member with his member ID "123456" purchased 6 units of a product with its model number "7321" at the price of 1,200 yen per unit with credit on Mar. 1, 1998, and that the accumulated points for the member have become "123" as a result.

Note that the accumulated points are indices for selecting the services for the members. The service history information in the present embodiment is not limited to the above-mentioned questionnaire information 108a and the purchase information 108b, but it may include the inquiry information including the contents of the members' inquiries about the products.

FIG. 32 is a table showing the service information 105a stored in the service information unit 105.

This service information 105a includes keywords such as a "microwave oven" registered in the dictionary information 206a held by the analyzing server A2, relevant information such as "want" and "want to buy" in relation to the keyword "microwave oven", for instance, and services associated with the keywords and the relevant information.

The services include a plurality of texts mentioned above, contents summarizing the texts (summaries) such as "point plan information" and "bargain information", and means (methods) for providing the texts such as "e-mail" and "personal page".

Here, the "personal page" means a members-only WWW page specific to each member, on which messages for the member and others are posted.

Also, the "text" means, if the service providing means is e-mail, a main part of the sentences inserted in the e-mail to the member, and if it is a personal page, a main part of the sentences posted on the member's personal page. This text is predicted as concrete information requested by the member so as to be handled by the service unit 102.

The service information 105a as shown in FIG. 32 includes the following four services by associating with the relevant information "want" of the keyword "microwave oven": the service of providing an "e-mail" about "point plan information" with the text saying "You have accumulated more than 100 points . . . "; the service of providing an "e-mail" about "bargain information" with the text saying "We will offer our microwave ovens at substantially reduced prices . . . "; the service of providing a "personal page" about "point plan information" with the text saying "You have accumulated more than 100 points . . . "; and the service of providing a "personal page" about "bargain information" with the text saying "We will offer our microwave ovens at substantially reduced prices . . . ".

On the other hand, the analyzing server A2 includes, as shown in FIG. 27, a predicting unit 201 that is a deriving means for predicting and deriving categories of the members' interest; a category information unit (area information holding means) 205 for storing category information (interest area information) referred to by the predicting unit 201 for the prediction; a result storing unit 202 for storing the prediction results as prediction result information 202a; a keyword extracting unit 203 for searching the dictionary information 206a for keywords belonging to the categories predicted by the predicting unit 201 based on the prediction result information 202a to extract the keywords; a keyword dictionary unit 206 for storing the dictionary information 206a; an extraction result storing unit 204 for storing the extracted keywords as extraction result information 204a; a searching unit 208 for accessing the members' own home pages to search for the keywords stored in the extraction result information 204a and extracting the descriptions including the keywords; and a search result storing unit 207 for storing the extracted descriptions as search result information 207a.

The analyzing server A2 further includes a service pattern unit (summary information holding means) 210 for holding the information except the texts in the service information 105a as pattern information (summary information) 210a; navigation unit 211 for controlling mutually with the analysis instructing terminal D2 so that the service provider can accurately specify the services requested by the member from among the pattern information 210a based on the search result information 207a in the search result storing unit 207 and the pattern information 210a in the service pattern unit 210, and selecting the services in response to the instruction from the analysis instructing terminal D2; a selection result displaying unit 215 for displaying the services selected in the navigation unit 211 and the pattern information 210a on the analysis instructing terminal D2; and a selection result storing unit 209 for storing the selection result by the navigation unit 211. In the present embodiment, a service instructing means is comprised of the analysis instructing terminal D2, and a selecting means is comprised of the navigation unit 211 and the selection result displaying unit 215.

The analyzing server A2 further includes an analysis instructing unit 212 for instructing the predicting unit 201 to start predicting a category depending on the control signal from the analysis instructing terminal D2; a search result displaying unit 213 for displaying on the analysis instructing terminal D2 the contents and the update situation of the search result information 207a in the search result storing unit 207; and a service selection instructing unit 214 for instructing the navigation unit 211 to select the services depending on the control signal from the analysis instructing terminal D2. In the present embodiment, a description extracting means is comprised of the searching unit 208 and the search result displaying unit 213.

The predicting unit 201 searches the category information 205a for the category based on the information such as the service history information including the questionnaire information 108a and the purchase information 108b stored in the service history unit 108 of the member service server A1, the member information 109a stored in the member information unit 109 of the member service server A1, and the log information 110a stored in the log information unit 110 of the member service server A1, and predicts the category as that of the member's interest.

In the category information 205a, the categories which are generally derived from the contents of the service history information, the member information 109a and the log information 110a, respectively, are compiled and stored by each content.

FIG. 33A is a table showing the category information 205a based on the questionnaire results.

In the category information 205a as shown in FIG. 33A, which is compiled by a questionnaire ID, the question numbers assigned to respective questions of the questionnaire, the answer numbers assigned to all the selectable answers to the questions and the categories derived from the answers with those answer numbers.

For example, when judging that the answer number to the question number "2" of the questionnaire ID "123" is "1" based on the contents of the questionnaire information 108a, the predicting unit 201 searches the above-mentioned category information 205a for the category applicable to the above contents, and predicts "stock information" for the category of the member's interest.

FIG. 33B is a table showing the category information 205a derived based on the purchase history.

In the category information 205a shown in FIG. 33B, the model numbers of the products and the categories derived from the model numbers are stored.

For example, when judging that the member has purchased the product with model number "1006" based on the contents of the purchase information 108b, the predicting unit 201 searches the category information 205a for the category applicable to the above contents, and predicts a "video player" for the category of the member's interest.

FIG. 33C is a table showing the category information 205a derived based on the questionnaire results and the members' sex.

In the category information 205a shown in FIG. 33C, which is complied by a questionnaire ID, the question numbers assigned to respective questions of the questionnaire, the answer numbers assigned to all the selectable answers to the questions, the members' sex categorized by each answer number, and the categories derived from the answers with respective answer numbers and the sex are stored.

For example, when judging that the answer number to the question number "1" of the questionnaire ID "123" is "2" and the sex is "male" based on the contents of the questionnaire information 108a and the member information 109a, the predicting unit 201 searches the category information 205a for the category applicable to the above contents, and predicts a "computer" for the category of the member's interest.

In this case, it is possible to predict the category of the member's interest much more accurately based on the attributes in the member information 109a, compared with predicting the category based on the category information 205a as shown in FIG. 33A.

FIG. 33D is a table showing the category information 205a derived based on the log information 110a.

In the category information 205a as shown in FIG. 33D, the numbers of the WWW pages, the information on whether the WWW page with each number has been viewed twice or more, the information on whether the WWW page with each number has been viewed for five minutes or more, and the categories derived from these information and the numbers of the WWW pages are stored.

For example, when judging based on the contents of the log information 110a that the member views the news WWW page with the number "5" twice or more a day and for five minutes or more for one view, the predicting unit 201 searches the category information 205a for the category applicable to the above contents, and predicts "stock information" for the category of the member's interest. Also, when judging that the member views the WWW page twice or more a day but for less than five minutes for one view, the predicting unit 201 predicts, based on the category information 205a, "economic information" which belongs to broader category than "stock information" for the category of the member's interest.

In this case, the predicting unit 201 can predict accurately the category of the member's interest depending on the number and time duration of the member's views of the WWW pages. In the category information 205a as shown in FIG. 33D, the threshold number of views is 2 and the threshold time duration of one view is 5 minutes, but the present invention is not limited to those values, and the threshold number of views may be 3 or more, or the threshold time duration of one view may be 6 minutes or more.

When the category information 205a as shown in FIG. 33C is used, the predicting unit 201 predicts the category of the member's interest based on the contents of the questionnaire information 108a and the member information 109a, but it may predict that category based on at least two of the member information 109a, the questionnaire information 108a, the purchase information 108b and the log information 110a.

In this case, the category information unit 205 holds the respective contents of at least two of these information used for the predicting unit 201 to predict the category, and the category information 205a including the categories generally derived from the respective contents, which allows the predicting unit 201 to predict more accurately the category of the member's interest.

The category predicted by the predicting unit 201 as mentioned above is stored in the result storing unit 202 as the prediction result information 202a.

FIG. 34 is a table showing the prediction result information 202a.

In the prediction result information 202a, the member IDs and the categories of the members' interests with those member IDs are stored.

For example, in the prediction result information 202a as shown in FIG. 34, the categories predicted by the predicting unit 201, "kitchen appliance", "cell phone", "personal computer" and "audio device" are stored by associating with the member ID "123456".

FIG. 35 is a table showing the dictionary information 206a stored in the keyword dictionary 206.

In the dictionary information 206a, one or more keywords which are specific contents belonging to each category stored in the category information 205a are stored by associating with that category.

For example, in the dictionary information 206a as shown in FIG. 35, the keyword 1 "microwave oven", the keyword 2 "rice cooker" and the keyword 3 "induction heating cooker" are stored by associating with the category "kitchen appliance".

Based on the prediction result information 202a and the dictionary information 206a, the keyword extracting unit 203 extracts the keywords belonging to the category of the member's interest, and stores the extraction results as the extraction result information 204a in the extraction result storing unit 204. At the same time, the keyword extracting unit 203 also extracts the URL of the member's own home page from the member information 109a of the member information unit 109 to store it in the extraction result storing unit 204.

FIG. 36 is a table showing the extraction result information 204a.

In the extraction result information 204a, the member IDs, the URLs of the home pages of the members with those member IDs, and extracted one or more keywords for each member are stored.

For example, in the extraction result information 204a as shown in FIG. 36, the URL "http://www.matsushitaxx.ne.jp/" of the home page of the member with the member ID "123456" and the keyword 1 "microwave oven", the keyword 2 "rice cooker" and the keyword n "induction heating cooker" are stored by associating with the member ID. Here, the number of keywords stored by associating with the member ID is the total of the keywords extracted for respective categories predicted by the predicting unit 201.

The searching unit 208 accesses the member's home page on the public site C based on URL in the extraction result information 204a, searches the home page for the keywords in the extraction result information 204a, and extracts the descriptions including the keywords.

It will be explained below with reference to FIG. 37 how the searching unit 208 operates for extracting descriptions including keywords from a member's own home page.

Figure 37:
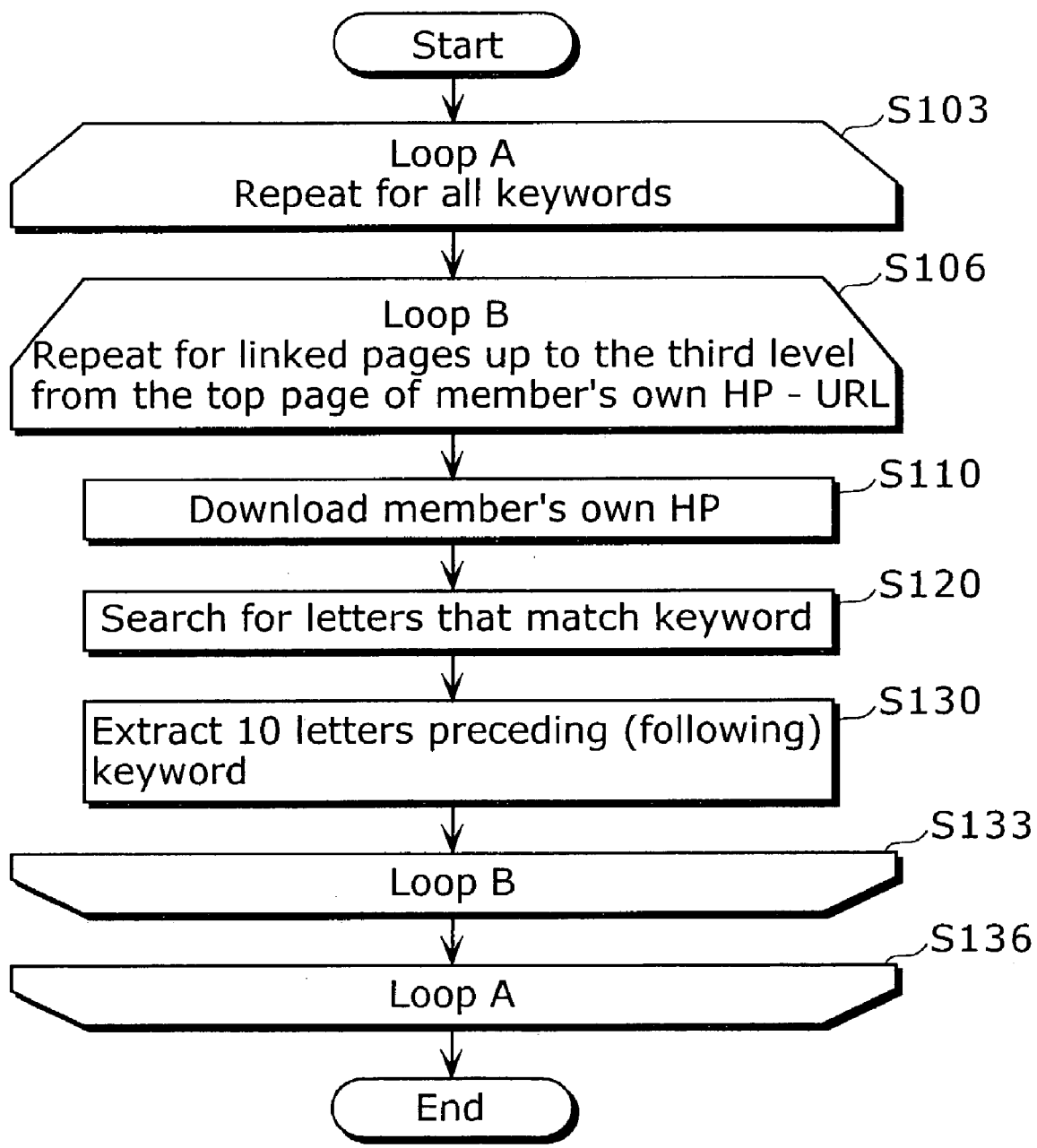
FIG. 37 is a flowchart showing operation of extracting descriptions including a keyword from a member's own home page (website) of the second embodiment.

FIG. 37 is a flowchart showing the operation of the searching unit 208.

When the extraction result information 204a in the extraction result storing unit 204 is updated, the searching unit 208 accesses the member's own home page based on a URL in the updated extraction result information 204a, repeats the operation of the following Steps S106~S133 (Loop B) for linked pages up to the third level from the top page of the home page, and then repeats the operation of Steps S103~S136 (Loop A) including the loop B for all the keywords for the members registered in the extraction result information 204a.

More specifically, the searching unit 208 first downloads the top page of the home page (Step S110).

Next, the searching unit 208 searches the top page for one keyword for the member registered in the extraction result information 204a (Step S120), and if it finds the keyword, it extracts the above-mentioned descriptions including the keyword and 10 letters preceding the keyword, for instance (Step S130).

Then, the searching unit 208 repeats the operation of Step S110~S130 for the linked pages up to the third level from the top page to extract the descriptions, and further repeats the operation of Steps S110~S130 for all the keywords for the member registered in the extraction result information 204a to extract the descriptions.

In this case, the searching unit 208 downloads the home page in Step S110, but in Step S120, the searching unit 208 may search for the letters matching the keyword in the public site C where the member's own home page is posted, without downloading the home page.

Also, in this case, the searching unit 208 extracts the keyword and 10 letters preceding it as descriptions, but the present invention is not limited to that. The searching unit 208 may extract the keyword and 10 letters following it as descriptions, or extract one sentence including the keyword as descriptions. The number of letters preceding or following the keyword which are to be extracted as descriptions is not limited to 10, but any number may be applied if it is one or more.

In addition, in this case, the searching unit 208 searches the linked pages up to the third level from the top page of the home page, but the present invention is not limited to that. The searching unit 208 may search the linked pages up to the first, the second or the fourth or more level.

Figure 38:
FIG. 38 is a page display showing an example of the member's own home page of the second embodiment.

FIG. 38 is a page display showing an example of a member's own home page.

The searching unit 208 accesses the member's own home page as shown in FIG. 38, and extracts, as the descriptions including a keyword "microwave oven", for instance, "I want a microwave oven", "I want to buy a microwave oven with single function" and "I think microwave ovens are convenient".

After extracting the descriptions in this manner, the searching unit 208 stores the extraction result in the search result storing unit 207 as the search result information 207a.

FIG. 39 is a table showing the search result information 207a.

In the search result information 207a, the member IDs, the keywords which the searching unit 208 has used for the search, and the descriptions extracted from the home page are stored.

For example, in the search result information 207a as shown in FIG. 39, the member ID "123456", the keyword used for searching from the member's own home page, and the descriptions extracted for the keyword, such as "I want a microwave oven", "I want to buy a microwave oven with single function" and "I think microwave ovens are convenient" are stored.

Note that in the present embodiment, URLs of the home pages of the members registered in the member information 109a are obtained with the members' consent, and thus the descriptions are also extracted with the members' consent, from their home pages using the URLs obtained in this manner.

FIG. 40 is a table showing the pattern information 210a.

In the pattern information 210a, the information other than the texts of the services in the service information 105a of the service information unit 105 is stored, as mentioned above. More specifically, all the keywords included in the dictionary information 206a of the keyword dictionary unit 206, the relevant information on respective keywords, and one or more services associated with the keywords and relevant information are stored. These services include the means for providing the services such as e-mails and personal pages, and the contents of the services for respective means. Here, the contents of the services mean the contents summarizing the texts in the service information 105a.

For example, in the pattern information 210a as shown in FIG. 40, the keyword "microwave oven"; the relevant information "I want"; and the services such as "point plan information" provided by e-mail, "bargain information" provided by e-mail, "point plan information" provided by a personal page, and "bargain information" provided by a personal page are stored.

A flow of information processing up to the service providing for the member with the member ID "123456" registered in the member information 109a will be explained below specifically with reference to FIG. 41.

Figure 41:
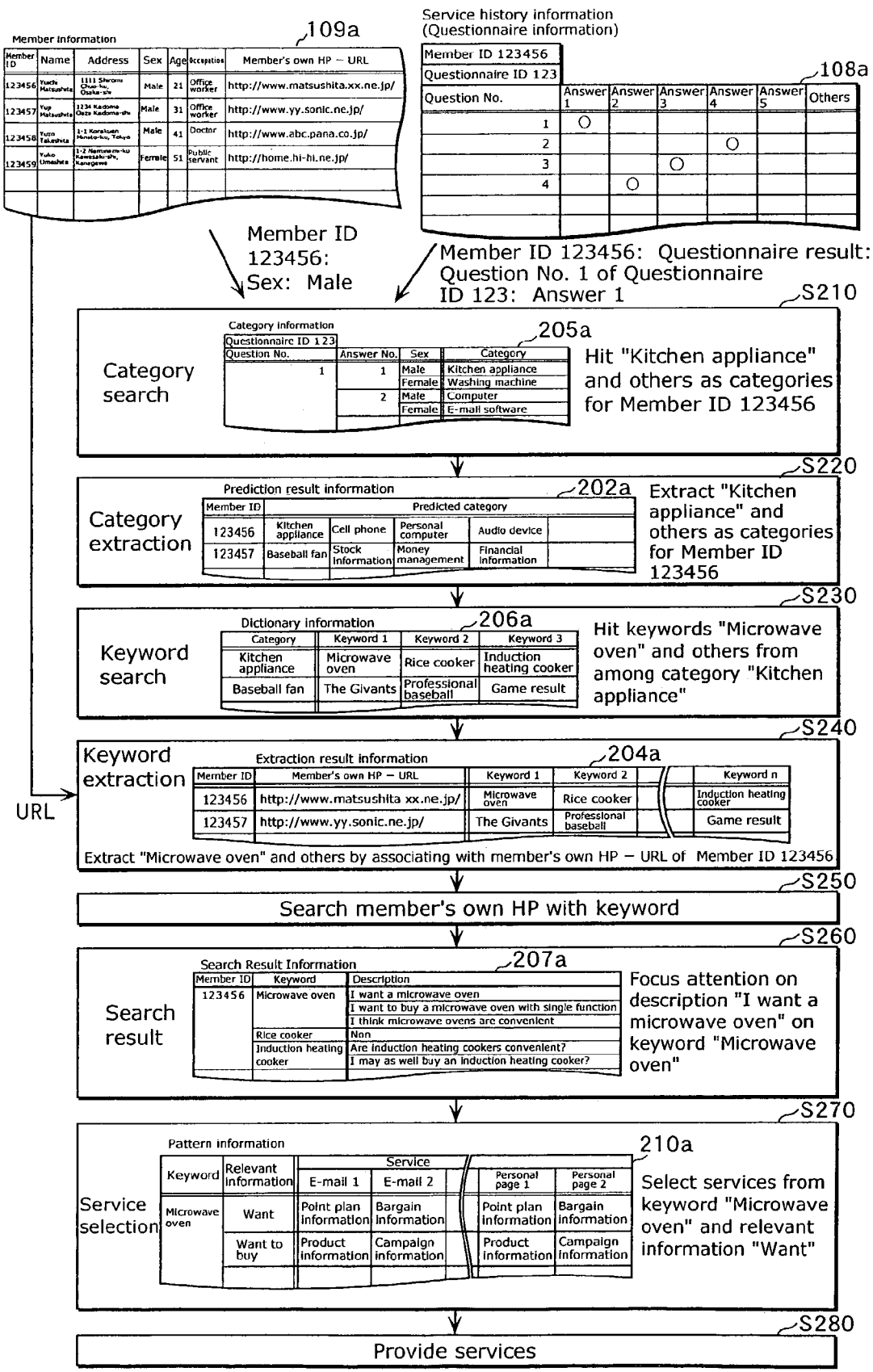
FIG. 41 is a flowchart showing an example flow of information processing in the second embodiment.

FIG. 41 is a flowchart showing an example of the information processing.

The service provider operates the analysis instructing terminal D2 to instruct the analyzing server A2 of the service providing server A to analyze the services requested by the member with the member ID "123456" based on the questionnaire information 108a. Upon receipt of the instruction via the analysis instructing unit 212, the predicting unit 201 of the analyzing server A2 starts predicting the category in which the member with the member ID "123456" is interested.

The predicting unit 201 reads out the member information 109a in the member information unit 109 and the questionnaire information 108a in the service history unit 108, and as a result, obtains the information that the member with the member ID "123456" is a "male" and his answer to the question number "1" of the questionnaire ID "123" is "1". Then, the predicting unit 201 searches the category information 205a stored in the category information unit 205 for the category applicable to the obtained information, and predicts the category of the services requested by the member (Step S210).

In this case, since the category which corresponds to the answer number "1" to the question number "1" and the sex "male" is "kitchen appliance" in the category information 205a, the predicting unit 201 predicts that the category of the member's interest is "kitchen appliance".

The predicting unit 201 also makes a prediction based on the answers to other questions of the questionnaire information 108a to predict a plurality of categories including "kitchen appliances" as those of the member's interest.

Next, after predicting a plurality of categories including "kitchen appliance" as mentioned above, the predicting unit 201 extracts these categories from the category information 205a to update the prediction result information 202a in the result storing unit 202 (Step S220). Thus, the extracted categories such as "kitchen appliance" are stored in the prediction result information 202a by associating with the member ID "123456".

When the prediction result information 202a in the result storing unit 202 is updated, the keyword extracting unit 203 searches the dictionary information 206a stored in the keyword dictionary unit 206 for the keywords corresponding to the categories associated with the member ID "123456" in the prediction result information 202a (Step S230).

For example, since the keywords corresponding to the category "kitchen appliance" are "microwave oven", "rice cooker" and "induction heating cooker", the keyword extracting unit 203 judges that these keywords "microwave oven", "rice cooker" and "induction heating cooker" correspond to the search criteria.

The keyword extracting unit 203 also makes the above-mentioned search for other categories predicted by the predicting unit 201, and judges whether keywords other than "microwave oven", "rice cooker" and "induction heating cooker" correspond to the search criteria.

Next, the keyword extracting unit 203 extracts the keywords searched as above from the dictionary information 206a, and updates the keywords associated with the member ID "123456" in the extraction result information 204a stored in the extraction result storing unit 204 into the above-mentioned extracted keywords. If the member ID "123456" is not stored in the extraction result information 204a, the keyword extracting unit 203 stores the member ID "123456" in the extraction result information 204a before extracting the URL of the member's own home page from the member information 109a, and stores the URL and the extracted keywords such as "microwave oven" in the extraction result information 204a by associating with the member ID "123456" (Step S240).

After the extraction result information 204a is updated, the searching unit 208 accesses the home page located at the URL of the member ID "123456" stored in the extraction result information 204a, and searches the home page for the keywords associated with the member ID "123456" (Step S250).

At that time, the searching unit 208 extracts the keywords and the descriptions including 10 letters, for instance, preceding or following the keywords, from the home page.

Then, the searching unit 208 updates the keywords and the descriptions associated with the member ID "123456" in the search result information 207a stored in the search result storing unit 207 based on the search and extraction result mentioned above. If the member ID "123456" is not stored in the search result information 207a, the searching unit 208 additionally stores the member ID "123456" and the above-mentioned keywords and descriptions in the search result information 207a (Step S260).

Here, the search result by the searching unit 208, that is, the updated search result information 207a, is displayed on the analysis instructing terminal D2 via the search result displaying unit 213.

Focusing attention on the description "I want a microwave oven" corresponding to the keyword "microwave oven" associated with the member ID "123456" based on the search result information 207a displayed on the analysis instructing terminal D2, the service provider can obtain the information that the member is not interested in an "electric blender" or an "electric grill" but in a "microwave oven" among the information belonging to the category "kitchen appliance" and, more specifically, the information that the member does not "want to sell a microwave oven" nor "want to know the principle of microwave ovens", but she "wants a microwave oven".

As a result, the service provider can predict accurately the services the member with the member ID "123456" is likely to want based on the information displayed on the analysis instructing terminal D2.

Then, the service provider selects the services to be provided for the member from among the pattern information 210a in the service pattern unit 210 displayed on the analysis instructing terminal D2, under the control of the navigation unit 211 (Step S270).

Specifically, if there is "want" in the relevant information corresponding to the keyword "microwave oven" in the pattern information 210a, the service provider operates the analysis instructing terminal D2 to specify the services associated with the relevant information "want", and instructs the navigation unit 211 to select them as services to be provided for the member.

Upon receipt of this instruction via the service instructing unit 214, the navigation unit 211 selects the services from among the services stored in the pattern information 210a based on the instruction, and stores the selection result in the selection result storing unit 209.

Then, when the service provider operates the service instructing terminal D1 to instruct the member service server A1 to start providing the services, the member service server A1 provides the selected services to the member based on the information stored in the selection result storing unit 209 (Step S280).

The selection of the services in above-mentioned Step S270 will be explained below in detail.

For selecting the services, the navigation unit 211 displays a "service selection menu" screen for accepting the instruction from the analysis instructing terminal D2 on the analysis instructing terminal D2 via the selection result displaying unit 215 and the search result displaying unit 213.

Figure 42:
FIG. 42 is a screen display showing a service selection menu screen of the second embodiment.

FIG. 42 is the "service selection menu" screen displayed on the analysis instructing terminal D2.

On the "service selection menu" screen, a search result information screen 207A showing the above-mentioned search result information 207a and a pattern information screen 210A showing the pattern information 210a are displayed.

Since the checkboxes for marking every relevant information are displayed on the pattern information screen 210A, the service provider marks a checkbox with reference to the search result information screen 207A so as to specify the services corresponding to the marked relevant information. Specifically, the service provider marks the checkbox by clicking a mouse at the box pointed to by the arrow.

Figure 43:
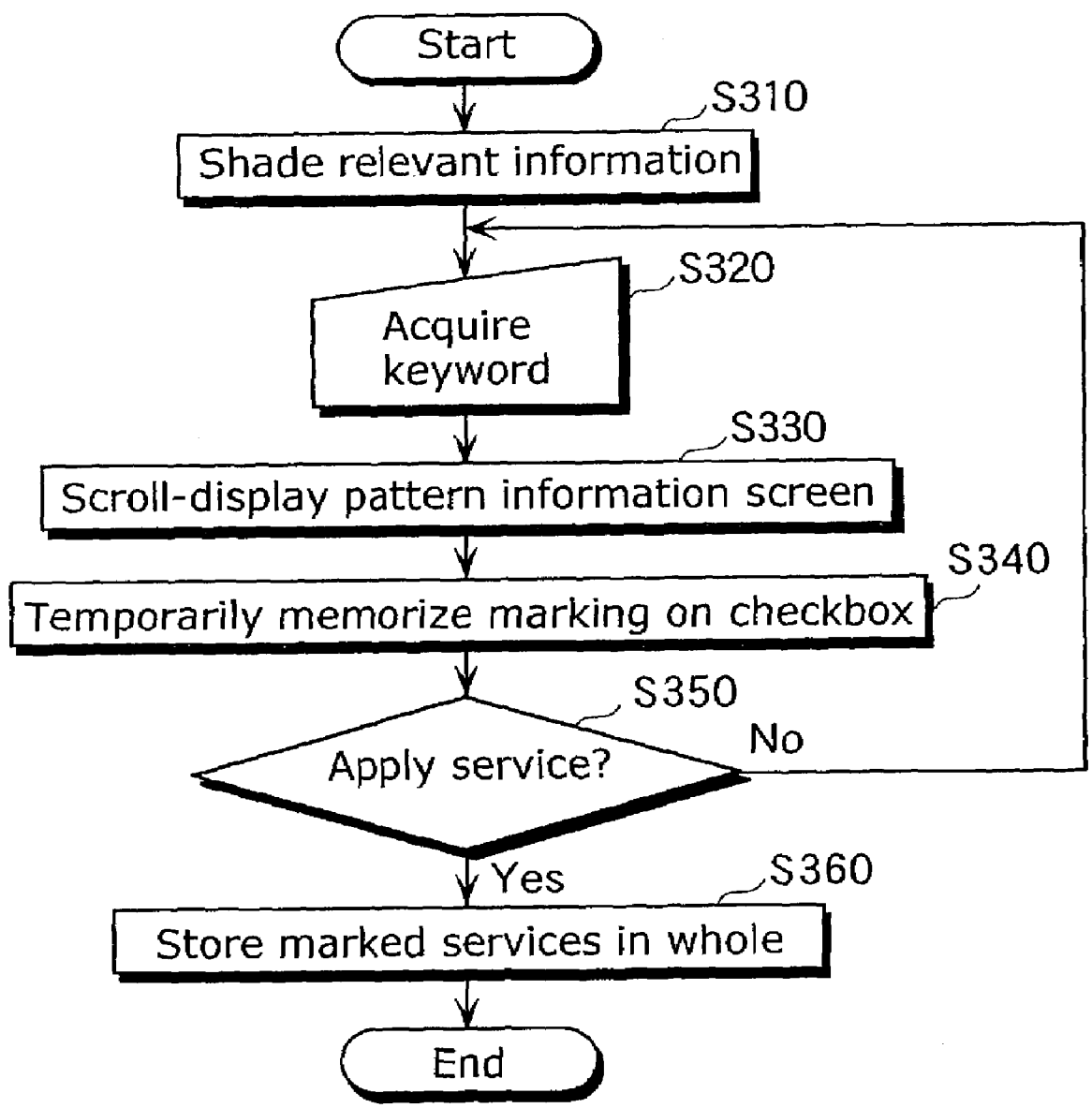
FIG. 43 is a flowchart showing operation performed when the service selection menu screen is displayed in the second embodiment.

FIG. 43 is a flowchart showing the operation of the navigation unit 211 for displaying the "service selection menu" to select the services for the members.

First, the navigation unit 211 searches for the relevant information corresponding to the keywords stored in the pattern information 210a from among the descriptions on the search result information screen 207A, and if there is the corresponding relevant information, the navigation unit 211 highlights or shades it so as to distinguish it from other information in a different display manner (Step S310).

For example, since there is the relevant information corresponding to the keyword "microwave oven" such as "want", "want to buy" and "want to sell" and others in the pattern information 210a, the navigation unit 211 searches the descriptions corresponding to the keyword "microwave oven" on the search result information screen 207A for the above-mentioned relevant information, and shades "want" and "want to buy" corresponding to the search result to display the relevant information thereof, as shown in FIG. 42.

As a result, since the relevant information stored in the pattern information 210a is displayed in the shaded manner on the search result information screen 207A, the service provider can easily find the relevant information stored in the pattern information 210a on the search result information screen 207A. Specifically, when finding the shaded relevant information "want" and "want to buy" in the descriptions corresponding to the keyword "microwave oven" displayed on the search result information screen 207A, the service provider can easily judge that the services corresponding to "want" and "want to buy" are stored in the pattern information 210a.

Further, when the service provider operates the analysis instructing terminal D2 to point to the keyword by an arrow to select it on the search result information screen 207A, the navigation unit 211 acquires the selected keyword (Step S320) and displays the selected keyword and the relevant information and services corresponding to the keyword in a scrolling manner on the pattern information screen 210A (Step S330).

For example, when the service provider points to the keyword "microwave oven" on the search result information screen 207A for selection, the navigation unit 211 acquires the selected keyword "microwave oven" and displays, on the pattern information screen 210A, the keyword "microwave oven", the relevant information "want" and "want to buy" corresponding to that keyword, and the services, such as "point plan information" and "bargain information", associated with these relevant information.

The navigation unit 211 can easily display, on the pattern information screen 210A, the services related to the search result information 207a from among the services stored in the pattern information 210a.

Here, for specifying the services corresponding to the relevant information "want" of the keyword "microwave oven", the service provider marks the checkbox corresponding to the relevant information "want". Then, the navigation unit 211 temporarily memorizes the marking on the checkbox to continue to display the marking (Step S340).

If the service provider specifies the services corresponding to other relevant information (No in Step S350), the navigation unit 211 repeats the above-mentioned operation of Steps S320~S340 according to the operation of the analysis instructing terminal D2 by the service provider.

When the service provider completes marking the checkboxes corresponding to the relevant information of all the services to be specified and selects a button "Apply" at the foot of the "service selection menu", the analysis instructing terminal D2 outputs a control signal for instructing the analyzing server A2 to select the services corresponding to all the relevant information marked on the checkboxes (Yes in Step S350).

As a result, upon receipt of the control signal outputted from the analysis instructing terminal D2 based on the above-mentioned operation via the service selection instructing unit 214, the navigation unit 211 selects, based on the control signal, the services to be provided for the member, that is, the services such as "point plan information" and "bargain information" by e-mail and "point plan information" and "bargain information" by personal page which correspond to the relevant information "want" of the keyword "microwave oven" marked on the checkbox, and stores them as the selection result information 209a (See FIG. 44) in the selection result storing unit 209 (Step S360).

If the checkboxes corresponding to the relevant information other than the information "want" are marked, the services associated with the other relevant information are also stored in the selection result information 209a in the selection result storing unit 209.

FIG. 44 is a table showing the selection result information 209a.

The selection result information 209a includes the member ID of the member, the services selected for the member, the keywords and the relevant information.

For example, as shown in FIG. 44, the selection result information 209a includes, for the member with the member ID "123456", the services of "point plan information" and "bargain information" by e-mail and the services of "point plan information" and "bargain information" by personal page which correspond to the relevant information "want" to the keyword "microwave oven". The selection result information 209a further includes the services of "purchaser report" and "campaign information" by e-mails and the services of "questionnaire" and "trade-in campaign" by the personal page which correspond to the relevant information "cheap" to the keyword "induction heating cooker".

A "Reset" button is displayed at the foot of the "service selection menu" screen. If the "Reset" button is selected before the "Apply" button is selected after the checkbox is marked, all the marks are cancelled.

For starting providing the services in Step S280 as shown in FIG. 41, the service provider operates the service instructing terminal D1 to display, on the service instructing terminal D1, a "service details setting" screen for selecting the details of some of the services selected on the "service selection menu"

More specifically, when the service provider enters a member ID of a member for providing services on the service instructing terminal D1, the service instructing terminal D1 outputs a control signal corresponding to the entry data. Upon receipt of the control signal via the service instructing unit 107, the editing unit 106 reads out the selection result information 209a corresponding to the member stored in the selection result storing unit 209, that is, the services selected for the member on the "service selection menu". The editing unit 106 notifies the service instructing terminal D1 of the read-out selection result information 209a, and the service instructing terminal D1, upon receipt of the notification, displays the services on the "service details setting" screen. The editing unit 106 further extracts the texts corresponding to the services stored in the selection result information 209a from the service information 105a in the service information unit 105, and notifies the service instructing terminal D1 of the extracted texts. As a result, on the "service details setting" screen, the services selected for the member on the "service selection menu" and the texts corresponding to the services are displayed.

FIG. 45 is the "service details setting" screen displayed on the service instructing terminal D1.

On the "service details setting" screen, the member ID of the member to whom the services are to be provided, a service screen 300A and a service text display screen 360A are displayed. The name and attributes of the member may be displayed on the "service details setting" screen, in addition to the member ID. In this case, the editing unit 106 acquires the attributes of the member from the member information 109a in the member information unit 109 and displays them on the service instructing terminal D1.

Here, on the service screen 300A, the means and types of all the services selected for the member from the "service selection menu", the checkboxes similar to those mentioned above which are respectively associated with the services, and the keywords and relevant information are displayed.

More specifically, when the service provider marks the checkboxes corresponding to the means and types of the services to be provided for the member on the "service details setting" screen to select the "OK" button at the foot of the screen, a control signal based on the marking is outputted from the service instructing terminal D1. Upon receipt of the control signal via the service instructing unit 107, the editing unit 106 further selects only the services corresponding to this marking to deem them as the services for the member, and stores the decision in the service information unit 105 temporarily.

For example, the editing unit 106 selects, as the services for the member, only "point plan information" services by e-mail and personal page which are marked on the "service details setting" screen, from among four services associated with the relevant information "want" of the keyword "microwave oven" marked on the "service selection menu", that is, "point plan information" and "bargain information" by e-mail and "point plan information" and "bargain information" by personal page.

On the other hand, on the service text display screen 360A, the text of each service displayed on the service screen 300A is displayed. For example, in association with the service of "point plan information" by "e-mail" for the relevant information "want" of the keyword "microwave oven" displayed on the service screen 300A, the text "You have accumulated more than 100 points . . . " is displayed on the service text display screen 360A.

Thus, when marking the checkbox on the service screen 300A as mentioned above, the service provider can easily grasp the text of the service corresponding to that marking.

Here, the service provider can modify the text on the service text display screen 360A before selecting the "OK" button.

More specifically, the editing unit 106 edits the text depending on the control signal outputted from the service instructing terminal D1 according to the entry of the service provider, creates, based on the editing result, the editing result information 105b associated with the member with the member ID displayed on the "service details setting" screen, and stores the editing result information 105b in the service information unit 105. When editing the text, the editing unit 106 determines whether or not the editing result information 105b associated with the member has been already stored in the service information unit 105. If it is not stored, the editing unit 106 creates the editing result information 105b associated with the member, and if it is stored, the editing unit 106 updates the editing result information 105b based on the editing result.

FIG. 46 is a table showing the editing result information 105b.

In the editing result information 105b, the member ID, the services selected on the "service details setting" screen from among the services for the member with the member ID included in the selection result information 209a, and the edited texts for the services if the texts are edited on the "service details setting" screen, are stored.

For example, the editing result information 105b as shown in FIG. 46 includes the member ID "123456"; the services of "point plan information" by "e-mail" and "personal page" corresponding to the relevant information "want" of the keyword "microwave oven"; the edited text for the services of "You have accumulated more than 120 points. You can exchange these points for a microwave oven with grill. Will you apply for it?" and "You have accumulated more than 120 points. You can exchange these points for a microwave oven with grill or a microwave oven with single function. Will, you apply for it?"; and the service of "questionnaire" by "personal page" associated with the relevant information "cheap" of the keyword "induction heating cooker". Since the text corresponding to the service of "questionnaire" is not edited on the "service details setting" screen, the information of "No change" is stored for the service of "questionnaire" in the editing result information 105b. The text corresponding to the service of "questionnaire" stored in the service information 105a is used for that service.

The texts in the service information 105a are not only read out for providing the services for the members, but may be read out and edited at any time by the editing unit 106 under the operation of the service instructing terminal D1, and stored in the service information unit 105 as the editing result information 105b. As mentioned above, since the editing unit 106 edits the texts of the service information 105a, the information which can be provided to the members is updated whenever necessary and made to be specific to each member.

Next, the editing unit 106 notifies the service instructing terminal D1 of the services selected and decided as mentioned above, and displays them as "service selection result" on the service instructing terminal D1.

FIG. 47 shows the "service selection result" screen.

On the "service selection result" screen, the member ID of the member to whom the services are to be provided and the service list screen 310A are displayed. On the service list screen 310A, the means, types and texts of the decided services, the keywords and the relevant information are displayed. On the "service selection result" screen, the attributes of the member with the member ID such as his name and sex may be displayed in addition to the member ID. In this case, the editing unit 106 acquires the attributes of the member from the member information 109a in the member information unit 109 and displays them on the service instructing terminal D1.

In addition, the texts displayed on the service list screen 310A are stored in the editing result information 105b. Specifically, on the service list screen 310A, only the texts edited on the "service details setting" screen are displayed from among the texts for the services, and the unedited texts are not displayed but the information "no change" is displayed. The edited texts are displayed with the edited portions underlined for highlighting them, for instance.

This "service selection result" screen allows the service provider to check what kinds of services were selected for the member and how the texts for the services were edited. For example, the "service selection result" screen as shown in FIG. 47 allows the service provider to confirm that "point plan information" on a microwave oven by e-mail and personal page and "questionnaire" on an induction heating cooker by personal page are selected for the member with the member ID "123456". It also allows the service provider to confirm that the text for the service of "point plan information" on a microwave oven by e-mail has been edited and the edited portions are "120" and "a microwave oven with grill".

When the service provider confirms the selected services on the "service selection result" screen and selects the "Decide Service" button at the foot of this screen, the service instructing terminal D1 instructs the member service server A1 to provide the services displayed on the service list screen 310A to the member with the member ID displayed on the "service selection result" screen.

Next, upon receipt of the instruction from the service instructing terminal D1 by the selection of the "Decide Service" button, the service instructing unit 107 of the member service server A1 notifies the service unit 102 of the instruction via the editing unit 106 and the service information unit 105. Upon receipt of the notification, the service unit 102 reads out the services stored in the editing result information 105b and the member ID because that editing result information 105b which is determined for the member on the "service details setting" screen is stored in the service information unit 105.

When the texts are stored in the services in the editing result information 105b, the service unit 102 extracts the texts, while when they are not stored (the information "no change" is stored), it reads out the service information 105a stored in the service information unit 105 to extract the texts corresponding to the services in the editing result information 105b. Then, the service unit 102 sends e-mails with the extracted texts or posts the extracted texts on the member's personal page, thereby providing the services for the member.

For example, if the editing result information 105b as shown in FIG. 46 is stored in the service information unit 105, the service unit 102 extracts the text "You have accumulated more than 120 points . . . " as a text for the service of "point plan information" by e-mail for the relevant information "want" of the keyword "microwave oven", and extracts the text "You have accumulated more than 120 points . . . " as a text for the service of "point plan information" by personal page for the relevant information "want" of the keyword "microwave oven". Also, in order to extract, from the editing result information 105b, the text for the service of "questionnaire" by personal page for the relevant information "cheap" of the keyword "induction heating cooker", the service unit 102 reads out the service information 105a from the service information unit 105 because that text is not stored in the editing result information 105b, and then extracts the text of the service information 105a corresponding to that service. If the service information 105a as shown in FIG. 32 is stored in the service information unit 105, for instance, the service unit 102 extracts the text corresponding to the service, "Are you dissatisfied with induction heating cookers?/Are low prices attractive?"

FIG. 48 is a diagram for explaining an example of sentences inserted in an e-mail.

As shown in FIG. 48, the service unit 102 creates the sentences including a header 320, a text 330 and a footer 340, inserted in an e-mail, and sends the e-mail.

Here, the sentence "We thank you very much for your continued patronage", without a member's name, in the header 320, is common to e-mails to all the members and for all the services, and is pre-stored in the service unit 102. In response to the above-mentioned notification from the service instructing unit 107, the service unit 102 creates the header 320 by combining the member's name and this pre-stored sentence.

Similarly, the footer is common to e-mails to all the members and for all the services, and is pre-stored in the service unit 102 as "Contact us", for instance.

More specifically, the service unit 102 places the text extracted from the editing result information 105b between the header 320 and the footer 340 to create the sentences to be inserted in the e-mail. If the text for the above-mentioned service is not stored in the editing result information 105, the service unit 102 extracts the text corresponding to that service from the service information 105a and places it between the header 320 and the footer 340 to create the text to be inserted in the e-mail.

Note that the sentences and the format as shown in FIG. 48 are just examples, and the present invention is not limited to those.

When the service unit 102 extracts, from the service information 105a, the text "Are you dissatisfied with induction heating cookers? . . . " for the service of "questionnaire" by personal page for the relevant information "cheap" of the keyword "induction heating cooker", as described above, it inserts the text extracted from the service information 105a into the questionnaire page and displays a button linked to that page on the member's personal page.

FIG. 49 is a screen display showing a questionnaire page.

On this screen, the questionnaire 350 including question boxes into which the texts extracted as above are inserted is displayed. Five answers, for instance, are prepared for each question, and a checkbox is provided for each answer in the same manner as mentioned above.

When the member marks the checkbox using the terminal device B to answer each question of the questionnaire 350 and selects the "OK" button at the foot of the screen, the answers are stored in the questionnaire information 108a in the service history unit 108.

As described above, in the present embodiment, since the predicting unit 201 predicts the category of the member's interest based on the information specific to the member such as the questionnaire information 108a and the log information 110a, and thus the descriptions belonging to the category are extracted from the member's own home page and displayed on the analysis instructing terminal D2, the service provider can accurately predict the services the member is most likely to want based on the descriptions. As a result, unnecessary information service for the member person can be prevented, and thus the communication load and power consumption can be reduced.

Note that the descriptions are extracted from the member's own home page using the URL registered in the member information 109a with the member's consent.

Also, when extracting the descriptions belonging to the category from the member's own home page, the analyzing server A2 searches the home page for the specific keywords belonging to the category, and extracts the descriptions including the keywords as the descriptions belonging to the category of the member's interest. Therefore, the analyzing server A2 can extract the descriptions belonging to the category from the member's own home page accurately and without omission.

In the present embodiment, since the service unit 102 of the service providing server A selects the texts to be provided to the member from among a plurality of texts pre-stored in the service information 105a for sending by e-mail or the like, the service provider can provide the services it predicts to the member easily without creating the sentences for the e-mail based on those services. Also, in the present embodiment, since the editing unit 106 edits the texts pre-stored in the service information 105a to create the sentences to be sent to the member by e-mail or the like, the service provider can provide the member-specific services easily without creating the member-specific sentences from scratch. In addition, as shown in FIG. 48, since the sentences inserted in each e-mail include the header 320 (except the member's name) and the footer 340 which are common to all the e-mails and the text 330, the service provider can send the appropriate sentences to the member, and further, the amount of the service information 105a can be reduced because the text in the service information 105a does not need to include the contents of the header 320 and the footer 340.

By displaying the summaries of the texts of the service information 105a and the editing result information 105b on the service instructing terminal D1 and the analysis instructing terminal D2, the service provider can easily be informed about what kinds of texts are stored in the service information 105a and the editing result information 105b, or what kinds of texts are to be provided to the members. Further, since the service provider specifies any of these contents displayed on the service instructing terminal D1 or the analysis instructing terminal D2 so as to select the texts in the service information 105a or the editing result information 105b which respectively correspond to the specified contents, the service provider can provide the services more easily.

As for specifying the services on the analysis instructing terminal D2, since the search result information screen 207A and the pattern information screen 210A are displayed on the analysis instructing terminal D2, the service provider can easily specify the services to be provided to the members based on the search result information 207a.

In addition, according to the present embodiment, the means for providing the services such as e-mail and personal page are included in the pattern information 210a and the service information 105a and the editing result information 105b in association with the texts and types of the services, so as to make the service instructing terminal D1 and the analysis instructing terminal D2 function as a providing method selecting means. Therefore, by operating the service instructing terminal D1 and the analysis instructing terminal D2, the means for providing the texts stored in the service information 105a or the editing result information 105b to the members can be selected, which allows improvement of usability.

The service providing device according to the present invention has been explained using the present embodiment, but the present invention is not limited to this embodiment.

For example, in the present embodiment, the analyzing server A2 starts analyzing the questionnaire information 108a and the log information 110a in response to the instruction from the analysis instructing terminal D2. However, the analyzing server A2 may perform batch processing of analysis every week or every three months, for instance, so as to update the search result information 207a in the search result storing unit 207 at every batch processing. Also, the analyzing server A2 may perform real-time processing of detecting the update of the questionnaire information 108a and the log information 110a so as to start analyzing at every update.

In the present embodiment, the service provider predicts to specify the services requested by the members based on the analysis results of the analyzing server A2, that is, the search result information 207a, but the navigation unit 211 may predict and specify the services.

More specifically, when searching to find the relevant information stored in the pattern information 210a based on the descriptions of the search result information 207a, the navigation unit 211 predicts that the services stored in the pattern information 210a by associating with the relevant information are those requested by the members, and specifies and selects them.

Therefore, the service provider can save the processing of predicting and specifying the services.

In the present embodiment, only keywords and descriptions are stored in the search result information 207a, but URLs of members' own home pages including these descriptions may be stored. In this case, the navigation unit 211 displays the descriptions and the URLs including them on the search result information screen 207A of the analysis instructing terminal D2.

Accordingly, the service provider can access the members' own home pages based on the URLs displayed on the search result information screen 207A so as to check the descriptions displayed on the search result information screen 207A.

Furthermore, the present embodiment has been explained on the assumption that it is an EC site, but it may be a community site.

In the present embodiment, the service providing server A includes the member service server A1 and the analyzing server A2, but the service providing server A may be one server itself.

In addition, in the present embodiment, as means for providing services, e-mail and personal page are used, but the present invention is not limited to those means. Letters, cards, data memory mediums such as CD-ROM, and brochures may be sent to the members. Therefore, choices of means are broadened and thus usability can be further improved.

Moreover, in the present embodiment, the service unit 102 provides the information sentences to the members, but the present invention is not limited to those sentences, and it may provide the audio and video information to the members. In this case, the audio and video data is pre-stored in the service information 105a, and thus audio and visual services can be provided to the members.

What is claimed is:

1. A service providing device connectable to a terminal device via a communication network that provides a service including at least information distribution to a customer using the terminal device, said service providing device comprising:

an information holding unit operable to acquire from the terminal device customer-specific information including location information indicating a location of a website owned by the customer, and hold the customer-specific information;

a deriving unit operable to derive an orientation area of the customer based on the customer-specific information;

a description extracting unit operable to access the website available at the location indicated by the location information and extract, from the website, an orientation area description associated with the orientation area derived by said deriving unit;

a dictionary information holding unit operable to hold dictionary information which stores a plurality of orientation areas and keywords, each keyword held in said dictionary information holding unit being associated with at least one of the orientation areas held in said dictionary information holding unit; and a keyword extracting unit operable to search the dictionary information held by said dictionary information holding unit for at least one keyword associated with the orientation area derived by said deriving unit, and extract the keyword, wherein said description extracting unit extracts the orientation area description by searching the website for the extracted keyword, and extracting the orientation area description including the extracted keyword.

2. The service providing device according to claim 1, wherein the customer-specific information is person-specific information, the customer is a person, the orientation area is an interest area, and the orientation area description is an interest area description.

3. The service providing device according to claim 2, wherein said description extracting unit is operable to extract from the website a sentence including the extracted keyword as the orientation area description.

4. The service providing device according to claim 2, wherein said description extracting unit is operable to search a top page of the website and a page linked up to a predetermined level from the top page for the extracted keyword.

5. The service providing device according to claim 2, further comprising:

a service information holding unit operable to hold service information which stores in advance a plurality of sentences which can be provided to the customer;

a summary information holding unit operable to hold summary information which stores a plurality of summaries, each of which corresponds to one of the sentences stored in the service information and is associated with one of the keywords stored in the dictionary information;

a service specifying unit operable to specify a service which is to be provided to the customer;

a summary displaying unit operable to display at least the summaries;

a selecting unit operable to have said summary displaying unit display the plurality of summaries stored in the summary information, each of which is associated with one of the stored keywords, and select any of the plurality of summaries based on a specification by said service specifying unit; and a providing unit operable to select a sentence corresponding to the summary selected by said selecting unit from among the plurality of sentences stored in the service information and provide the selected sentence to the customer, wherein said description extracting unit is operable to have said summary displaying unit display the extracted orientation area description by associating with extracted keyword associated with the orientation area description, and said selecting unit is operable to acquire the extracted keyword which said description extracting unit uses for extracting the orientation area description, and has said summary displaying unit display the summary associated with the extracted keyword from among the summaries stored in the summary information.

6. The service providing device according to claim 5, wherein each summary associated with a keyword stored in the summary information held by said summary information holding unit is further stored by associating with each relevant information indicated by one or more letters relevant to the associated keyword, and said selecting unit is operable to search the orientation area description extracted by said description extracting unit using a predetermined keyword for the relevant information of the predetermined keyword, and has said summary displaying unit display the relevant information in a display form distinguishable from other information.

7. The service providing device according to claim 2, wherein said description extracting unit is operable to extract from the website the orientation area description including the extracted keyword and a predetermined number of letters preceding the extracted keyword as the orientation area description.

8. The service providing device according to claim 2, wherein said description extracting unit is operable to extract from the website the orientation area description including the extracted keyword and a predetermined number of letters following the extracted keyword as the orientation area description.

9. A service providing method, executed by a service providing device that is connectable to a terminal device via a communication network, for providing a service including at least information distribution to a customer using the terminal device, said service providing method comprising:

acquiring from the terminal device customer-specific information including location information indicating a location of a webs ite owned by the customer, and holding the customer-specific information;

deriving an orientation area of the customer based on the customer-specific information;

extracting a keyword by searching dictionary information held in a dictionary information holding unit for at least one keyword associated with the derived orientation area, the dictionary information holding unit being operable to hold dictionary information including a plurality of orientation areas and keywords, each keyword held in the dictionary information holding unit being associated with at least one of the orientation areas held in the dictionary information holding unit; and accessing the website available at the location indicated by the location information and extracting, from the website, an orientation area description associated with the derived orientation area, wherein said extracting of the orientation area description includes searching the website for the extracted keyword and extracting the orientation area description including the extracted keyword.

10. The service providing method according to claim 9, wherein extracting the orientation area description comprises searching for the extracted keyword in a top page of the website and pages which are linked to the top page and within a predetermined level in a hierarchy.

11. The service providing method according to claim 9, wherein said extracting of the orientation area description comprises extracting the orientation area description that includes the extracted keyword and a predetermined number of letters preceding the extracted keyword from the website.

12. The service providing method according to claim 9, wherein said extracting of the orientation area description includes extracting the orientation area description that includes the extracted keyword and a predetermined number of letters following the extracted keyword from the website.

13. The program recorded on a computer-readable recording medium, said program for causing a service providing device connectable to a terminal device via a communication network to execute a service providing method for providing a service including at least information distribution to a customer using the terminal device, said program in combination with the medium comprising:

program code operable to acquire, from the terminal device, customer-specific information including location information indicating a location of a website owned by the customer, and holding the customer-specific information;

program code operable to derive an orientation area of the customer based on the customer-specific information;

program code operable to hold dictionary information including a plurality of orientation areas and keywords, each held keyword being associated with at least one of the held orientation areas;

program code operable to extract a keyword by searching the held dictionary information for at least one keyword associated with the derived orientation area; and program code operable to access the website available at the location indicated by the location information and extract, from the website, an orientation area description associated with the derived orientation area, wherein said program code operable to extract the orientation area description includes program code for searching the website for the extracted keyword and extracting the orientation area description including the extracted keyword.

14. The program recorded on a computer-readable recording medium, according to claim 13, wherein said program code operable to extract the orientation area description includes program code operable to search for the extracted keyword in a top page of the website and pages linked to the top page and within a predetermined level in a hierarchy.

15. The program recorded on a computer-readable recording medium according to claim 13, wherein said program code operable to extract the orientation area description includes program code operable to extract from the website the extracted keyword and a predetermined number of letters preceding the extracted keyword as the orientation area description.

16. The program recorded on a computer-readable recording medium according to claim 13, wherein said program code operable to extract the orientation area description includes program code operable to extract from the website the extracted keyword and a predetermined number of letters following the extracted keyword as the orientation area description.

17. A service providing device connectable to a terminal device via a communication network that provides a service including at least information distribution to a customer using the terminal device, said service providing device comprising:

an information holding unit operable to acquire from the terminal device customer-specific information including Uniform Resource Locators (URLs) indicating a location of a website owned by the customer, and hold the customer-specific information;

a deriving unit operable to derive an orientation area of the customer based on the customer-specific information;

a description extracting unit operable to access the website owned by the customer available at the URLs included in the customer-specific information and extract, from the website, an orientation area description associated with the orientation area derived by said deriving unit;

a dictionary information holding unit operable to hold dictionary information which stores a plurality of orientation areas and keywords, each keyword held in said dictionary information holding unit being associated with at least one of the orientation areas held in said dictionary information holding unit; and a keyword extracting unit operable to search the dictionary information held by said dictionary information holding unit for at least one keyword associated with the orientation area derived by said deriving unit, and extract the keyword, wherein said description extracting unit extracts the orientation area description by searching the website owned by the customer for the extracted keyword, and extracting the orientation area description including the extracted keyword from the website.

18. A service providing method, executed by a service providing device that is connectable to a terminal device via a communication network, for providing a service including at least information distribution to a customer using the terminal device, said service providing method comprising:

acquiring from the terminal device customer-specific information including Uniform Resource Locators (URLs) indicating a location of a website owned by the customer, and holding the customer-specific information;

deriving an orientation area of the customer based on the customer-specific information;

extracting a keyword by searching dictionary information held in a dictionary information holding unit for at least one keyword associated with the derived orientation area, the dictionary information holding unit being operable to hold dictionary information including a plurality of orientation areas and keywords, each keyword held in the dictionary information holding unit being associated with at least one of the orientation areas held in the dictionary information holding unit; and accessing the website owned by the customer available at the URLs included in the customer-specific information and extracting, from the website, an orientation area description associated with the derived orientation area, wherein said extracting of the orientation area description includes searching the website owned by the customer for the extracted keyword and extracting the orientation area description including the extracted keyword from the website.

19. The program recorded on a computer-readable recording medium, said program for causing a service providing device connectable to a terminal device via a communication network to execute a service providing method for providing a service including at least information distribution to a customer using the terminal device, said program in combination with the medium comprising:

program code operable to acquire, from the terminal device, customer-specific information including Uniform Resource Locators (URLs) indicating a location of a website owned by the customer, and holding the customer-specific information;

program code operable to derive an orientation area of the customer based on the customer-specific information;

program code operable to hold dictionary information including a plurality of orientation areas and keywords, each held keyword being associated with at least one of the held orientation areas;

program code operable to extract a keyword by searching the held dictionary information for at least one keyword associated with the derived orientation area; and program code operable to access the website owned by the customer available at the URLs included in the customer-specific information and extract, from the website, an orientation area description associated with the derived orientation area, wherein said program code operable to extract the orientation area description includes program code for searching the website owned by the customer for the extracted keyword and extracting the orientation area description including the extracted keyword from the website.

\* \* \* \* \*